(12) United States Patent
Conrad et al.

(10) Patent No.: US 6,328,527 B1
(45) Date of Patent: Dec. 11, 2001

(54) PRANDTL LAYER TURBINE

(75) Inventors: Wayne Ernest Conrad; Helmut Gerhard Conrad; Ted Szylowiec, all of Hampton; Dave Petersen, Courtice, all of (CA)

(73) Assignee: Fantom Technologies Inc., Welland (CA)

( * ) Notice: Subject to any disclaimer, the term of this patent is extended or adjusted under 35 U.S.C. 154(b) by 0 days.

(21) Appl. No.: 09/227,196

(22) Filed: Jan. 8, 1999

(51) Int. Cl.[7] .................. F01D 1/36; F03B 5/00; B63H 1/00; B64C 11/00
(52) U.S. Cl. .................. 415/90; 415/90; 416/175
(58) Field of Search .................. 415/90, 143, 1; 416/175

(56) References Cited

U.S. PATENT DOCUMENTS

| | | |
|---|---|---|
| Re. 28,742 | 3/1976 | Rafferty et al. . |
| 1,061,206 | 5/1913 | Telsa .................. 415/90 |
| 2,031,734 | 2/1936 | Riebel, Jr. et al. . |
| 2,087,834 | 7/1937 | Brown et al. . |
| 3,045,428 | 7/1962 | McLean . |
| 3,157,793 * | 11/1964 | Adkins .................. 415/90 X |
| 3,234,716 | 2/1966 | Sevin et al. . |
| 3,260,039 * | 7/1966 | Brown et al. .................. 415/90 X |
| 3,487,784 * | 1/1970 | Rafferty et al. .................. 416/90 X |
| 4,025,225 * | 5/1977 | Durant .................. 415/90 |
| 4,118,207 * | 10/1978 | Wilhelm .................. 55/338 |
| 4,186,554 * | 2/1980 | Possell .................. 415/90 X |
| 4,198,218 | 4/1980 | Erikson . |
| 4,201,512 | 5/1980 | Marynowski et al. .................. 415/90 |
| 4,218,177 | 8/1980 | Robel . |
| 4,402,647 | 9/1983 | Effenberger . |
| 4,416,582 * | 11/1983 | Glass .................. 415/90 X |
| 4,655,679 | 4/1987 | Giacomel . |
| 4,826,393 * | 5/1989 | Miki .................. 415/90 X |
| 4,826,515 | 5/1989 | Dyson . |
| 5,229,014 | 7/1993 | Collins . |
| 5,470,197 | 11/1995 | Cafarelli . |
| 5,553,998 * | 9/1996 | Muhlhoff et al. .................. 415/90 |
| 5,688,106 * | 11/1997 | Cerruti et al. .................. 415/90 |
| 5,709,528 * | 1/1998 | Hablanian .................. 415/90 |
| 5,746,789 | 5/1998 | Wright et al. . |
| 5,927,940 * | 7/1999 | Lotz .................. 415/90 |

FOREIGN PATENT DOCUMENTS

| | | |
|---|---|---|
| WO 93/19659 | 10/1993 | (EP) . |
| 363684 | 8/1906 | (FR) . |
| 1501927 | 2/1978 | (GB) . |
| 2 337 473 A | 11/1999 | (GB) . |
| 1139890 * | 2/1985 | (RU) .................. 415/90 |

* cited by examiner

Primary Examiner—John E. Ryznic
(74) Attorney, Agent, or Firm—Philip C. Mendes da; Bereskin & Parr

(57) ABSTRACT

An apparatus comprising a longitudinally extending housing having a fluid inlet port and a fluid outlet port; a plurality of spaced apart members rotatably mounted in the housing to transmit motive force between fluid introduced through the fluid inlet port and the spaced apart members, the spaced apart members having an upstream end and a downstream end; and, at least one fan member positioned in series with the spaced apart members.

16 Claims, 15 Drawing Sheets

PRANDTL LAYER TURBINE

FIELD OF THE INVENTION

This invention relates to an apparatus used to transmit motive force between a fluid and a plurality of spaced apart rotatable members. The apparatus may be used to transmit the motive force from a fluid to the spaced apart members or, alternately, from the spaced apart members to the fluid.

BACKGROUND OF THE INVENTION

Prandtl layer turbines were first described by Nikola Tesla in U.S. Pat. No. 1,061,206 (Tesla). For this reason, these turbines are sometimes referred to as "Tesla Turbines". FIGS. 1 and 2 show the design for a prandtl layer turbine as disclosed in Tesla. As disclosed by Tesla, a prandtl layer turbine 10 comprises a plurality of discs 12 which are rotatably mounted in a housing 14. Housing 14 comprises ends 16 and ring 18 which extends longitudinally between ends 16. Discs 12 are spaced apart so as to transmit motive force between a fluid in housing 14 and rotating discs 12.

The discs 12, which are flat rigid members of a suitable diameter, are non-rotatably mounted on a shaft 20 by being keyed to shaft 20 and are spaced apart by means of washers 28. The discs have openings 22 adjacent to shaft 20 and spokes 24 which may be substantially straight. Longitudinally extending ring 18 has a diameter which is slightly larger than that of discs 12. Extending between opening 22 and the outer diameter of disc 12 is the motive force transfer region 26.

The transfer of motive force between rotating discs 12 and a fluid is described in Tesla at column 2, lines 30–49. According to this disclosure, fluid, by reason of its properties of adherence and viscosity, upon entering through inlets 30, and coming into contact with rotating discs 12, is taken hold of by the rotating discs and subjected to two forces, one acting tangentially in the direction of rotation and the other acting radially outwardly. The combined effect of these tangential and centrifugal forces is to propel the fluid with continuously increasing velocity in a spiral path until it reaches a suitable peripheral outlet from which it is ejected.

Conversely, Tesla also disclosed introducing pressurized fluid via pipes 34 to inlets 32. The introduction of the pressurized fluid would cause discs 12 to rotate with the fluid travelling in a spiral path, with continuously diminishing velocity, until it reached central opening 22 which is in communication with inlet 30. Motive force is transmitted by the pressurized fluid to discs 12 to cause discs 12 to rotate and, accordingly, shaft 20 to rotate thus providing a source of motive force.

Accordingly, the design described in Tesla may be used as a pump or as a motor. Such devices take advantage of the properties of a fluid when in contact with the rotating surface of the discs. If the discs are driven by the fluid, then as the fluid passes through the housing between the spaced apart discs, the movement of the fluid causes the discs to rotate thereby generating power which may be transmitted external to the housing via a shaft to provide motive force for various applications. Accordingly, such devices function as a motor. Conversely, if the fluid in the housing is essentially static, the rotation of the discs will cause the fluid in the housing to commence rotating in the same direction as the discs and to thus draw the fluid through the housing, thereby causing the apparatus to function as a pump or a fan. In this disclosure, all such devices, whether used as a motor or as a pump or fan, are referred to as "prandtl layer turbines" or "Tesla turbines".

Various designs for prandtl layer turbines have been developed. These include those disclosed in U.S. Pat. No. 4,402,647 (Effenberger), U.S. Pat. No. 4,218,177 (Robel), U.S. Pat. No. 4,655,679 (Giacomel), U.S. Pat. No. 5,470,197 (Cafarelli) and U.S. Reissue Pat. No. 28,742 (Rafferty et al). Most of these disclosed improvements in the design of a Tesla turbine. However, despite these improvements, Tesla turbines have not been commonly used in commercial environment.

SUMMARY OF THE INVENTION

In accordance with the instant invention, there is provided an apparatus comprising:
  (a) a longitudinally extending housing having a fluid inlet port and a fluid outlet port;
  (b) a plurality of spaced apart members rotatably mounted in the housing to transmit motive force between fluid introduced through the fluid inlet port and the spaced apart members, the spaced apart members having an upstream end and a downstream end; and,
  (c) at least one fan member positioned in series with the spaced apart members.

At least one fan member may be positioned adjacent the upstream end and/or the downstream end of the spaced apart members and/or between two of the spaced apart member. Each spaced apart member may comprise a disc which has a surface for passage of fluid from an inner opening in the spaced apart member to an outer edge of the spaced apart member and the fan member has at least one blade which rotates in a space and the diameter of the space is substantially the same as the diameter of the inner opening of the spaced apart member immediately downstream and/or downstream of the fan member.

In another embodiment, the fan member is rotatably mounted with the spaced apart members.

In another embodiment, at least one fan member may be positioned upstream of and/or downstream of the spaced apart members.

In accordance with the instant invention, there is also provided a turbine comprising:
  (a) a housing having a fluid inlet port and a fluid outlet port;
  (b) a shaft rotatably mounted in the housing;
  (c) a plurality of spaced apart discs mounted on the shaft and rotatable therewith, each disc having a radial inner end defining an inner opening, a radial outer end and a pair of opposed surfaces extending therebetween, each surface having a radial inner portion and a radial outer portion; and,
  (d) at least one fan member mounted on the shaft.

At least one fan member may be positioned adjacent the upstream end and/or the downstream end of the spaced apart members and/or between two of the spaced apart member.

In one embodiment, the fan member has at least one blade which rotates in a space and the diameter of the space is substantially the same as the diameter of the inner opening of the disc immediately downstream and/or downstream of the fan member.

In accordance with the instant invention, there is also provided an apparatus comprising:
  (a) longitudinally extending housing having a means for permitting a fluid to enter the housing and means for permitting a fluid to exit from the housing;
  (b) a plurality of spaced apart means for transmitting motive force between fluid introduced through the means for permitting a fluid to enter the housing and the spaced apart means, the spaced apart means having an upstream end and a downstream end, each spaced apart means having a pair of opposed surfaces whereby the fluid passing over the surface forms a boundary layer which delaminates as it passes over the surface; and, (c) the apparatus having one or more of the characteristics selected from the group consisting of:
  i. means for introducing the fluid under pressure to the upstream end; and,
  ii. means for assisting in the withdrawal of fluid from the downstream end.

The means for introducing the fluid under pressure to the upstream end may be positioned in the housing. The means for assisting in the withdrawal of fluid from the downstream end may be positioned in the housing.

In accordance with the instant invention, there is also provided a method for transmitting motive force between a fluid and a plurality of spaced apart members comprising:

(a) introducing the fluid into a housing having a plurality of spaced apart members rotatably mounted in the housing;

(b) passing the fluid through the spaced apart members having an upstream end and a downstream end to form a boundary layer which passes over the spaced apart members; and, (c) passing the fluid through a fan to alter the fluid flow characteristics of the boundary layer as it passes through the housing.

The fan may be positioned adjacent the upstream end and the method may further comprise passing fluid through the fan to pressurize the fluid. Alternately, or in addition, the fan may be positioned adjacent the downstream end and the method may further comprise passing fluid through the fan.

DESCRIPTION OF THE DRAWINGS

These and other advantages of the instant invention will be more fully and particularly understood in connection with the following description of the preferred embodiments of the invention in which:

FIGS. 4b–4d are enlargements of area A of FIG. 4a;

FIG. 12b is a cross section along the line 12—12 in FIG. 12a;

DETAILED DESCRIPTION OF THE PREFERRED EMBODIMENT

Figure 1:
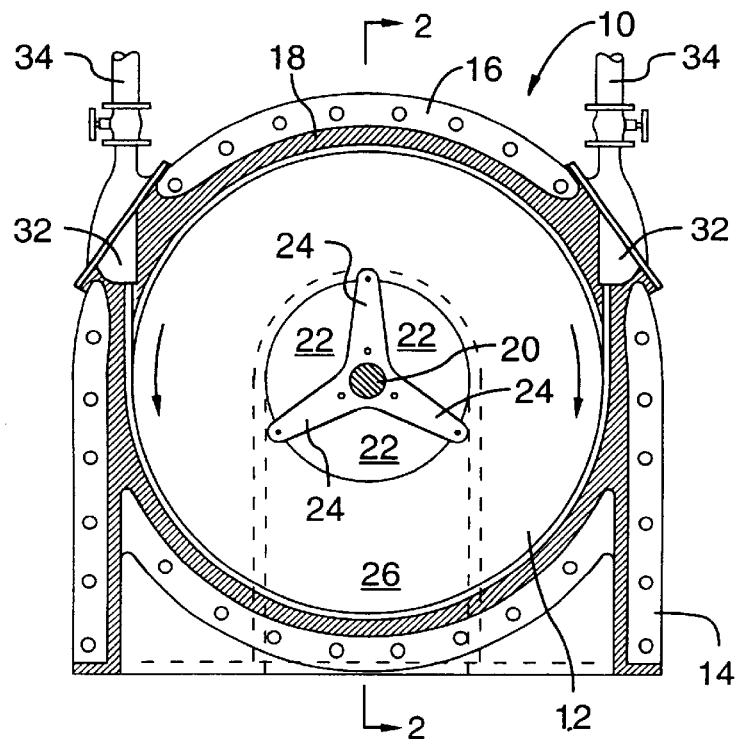
FIG. 1 is a cross section along the line 1—1 in FIG. 2 of a prior art prandtl layer turbine.
Figure 2:
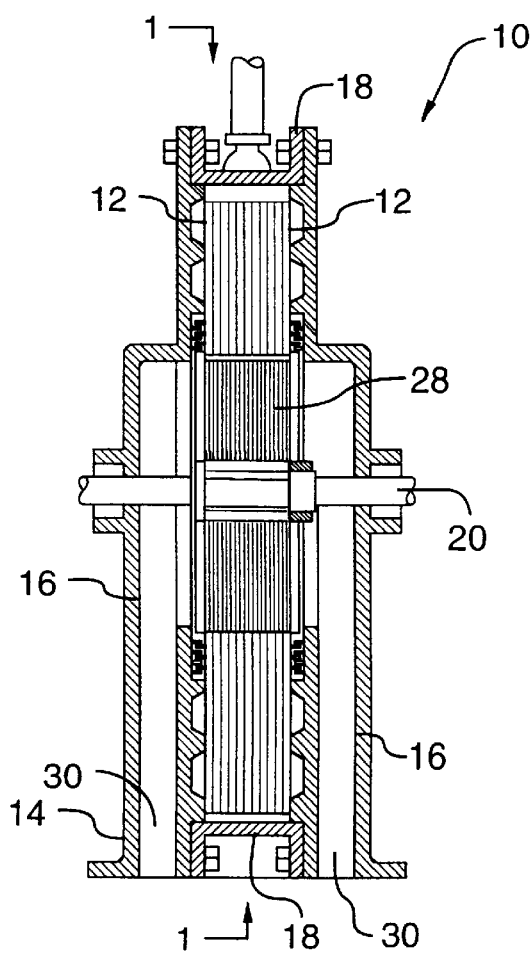
FIG. 2 is a cross section along the line 2—2 in FIG. 1 of the prior art prandtl layer turbine of FIG. 1.

According to the instant invention, improvements to the design of prandtl layer turbines are disclosed. These improvements may be used in conjunction with any known designs of prandtl layer turbines. Without limiting the generality of the foregoing, housing 14 may be of any particular configuration and mode of manufacture. Further, the fluid inlet and fluid outlet ports may be of any particular configuration known in the art and may be positioned at any particular location on the housing which is known in the art. In addition, while discs 12 are shown herein as being relatively thin, flat members with a small gap 56 between the outer edge of the disc and the inner surface of ring 18, it will be appreciated that they may be of any particular design known in the art. For example, they may be curved as disclosed in Effenberger and/or the distance between adjacent discs may vary radially outwardly from shaft 20. Further, the perimeter of discs 12 need not be circular but may be of any other particular shape. Accordingly, discs 12 have also been referred to herein as "spaced apart members".

Figure 3:
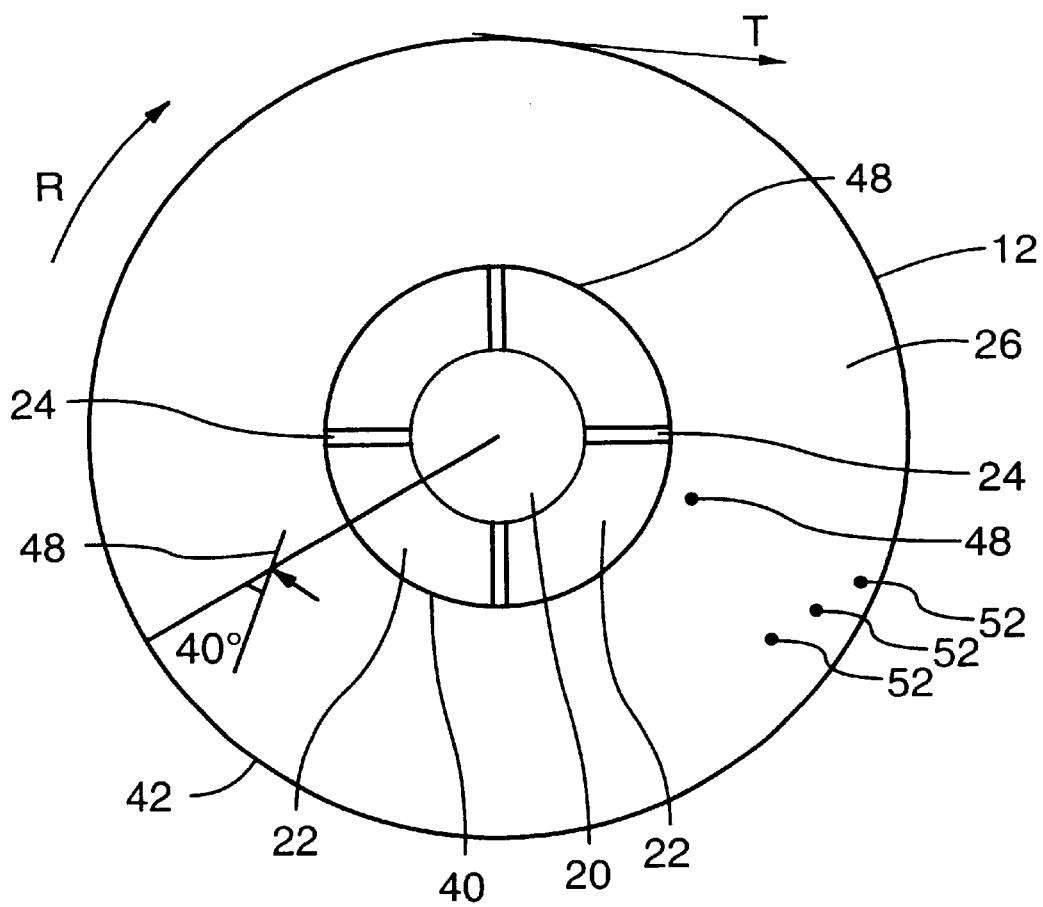
FIG. 3 is a top plan view of a disc according to a first preferred embodiment of the instant invention.

Referring to FIGS. 3 and 4a–d, preferred embodiments for spaced apart members 12 are shown. As shown in FIG. 3, spaced apart members 12 have an inner edge 40 and an outer edge 42. If spaced apart member 12 has a central circular opening 22, then inner edge 40 defines the inner diameter of spaced apart member 12. Further, if the periphery of spaced apart member 12 is circular, then outer edge 42 defines the outer diameter of spaced apart member 12.

Spaced apart members 12 may extend at any angle form shaft 20 as is known in the art and preferably extend at a right angle from shaft 20. Further, spaced apart member 12 may have any curvature known in the art and may be curved in the upstream or downstream direction (as defined by the fluid flow through housing 14). Preferably, spaced apart member 12 is planer so as to extend transversely outwardly from shaft 20. In this specification, all such spaced apart members are referred to as extending transversely outwardly from longitudinally extending shaft 20.

Each spaced apart member 12 has two opposed sides 44 and 46 which extend transversely outwardly from inner edge 40 to outer edge 42. These surfaces define the motive force transfer region 26 of spaced apart members 12. The spacing between adjacent spaced apart members 12 may be the same or may vary as is known in the art.

Without being limited by theory, as a fluid travels across motive force transfer region 26, the difference in rotational speed between the fluid and spaced apart member 12 causes a boundary layer of fluid to form adjacent opposed surfaces 44, 46. If the fluid is introduced through openings 22, then the fluid will rotate in a spiral fashion from inner edge 40 outwardly towards outer edge 42. At some intermediate point, the fluid will have sufficient momentum that it will separate from opposed surfaces 44, 46 (i.e. it will delaminate) and travel towards the fluid exit port. By thickening the boundary layer, for a given rotation of a spaced apart member 12, additional motive force may be transferred between the rotating spaced apart member 12 and the fluid. Thus the efficiency of the motive force transfer between spaced apart members 12 and the fluid may be increased.

The boundary layer may be thickened for a particular opposed surface 44, 46 of a particular spaced apart member by providing an area on that spaced apart member 12 having an increased width (i.e. in the longitudinal direction) at at least one discrete location of the particular opposed surface 44, 46. Preferably, a plurality of such areas of increased width are provided on each opposed surface 44, 46 of a particular spaced apart member 12. Further, preferably such areas of increased width are provided on at least some, preferably a majority and most preferably all of spaced apart members of turbine 10.

Referring to FIGS. 3 and 4, the discrete areas of increased width may be provided by having raised portions 48 which are positioned at any place on surface 44, 46. As shown in FIG. 3, these may be positioned on the inner portion of spaced apart member 12 such as adjacent inner edge 40 or spaced some distance outwardly from inner edge 40. Raised portion 48 preferably is positioned on the inner portion of spaced apart member 12. Further, a series of raised portions 48 may be sequentially positioned outwardly on spaced apart member 12 so as to successively thicken the boundary layer as it encounters a plurality of raised areas 48.

Raised portion 48 is a discontinuity or increased width in surface 44, 46 which the fluid encounters as it rotates around spaced apart member 12. As the fluid passes over raised portion 48, the boundary layer thickens. By passing the fluid over a series of raised portions, the boundary layer may be continuously thickened. This is advantageous as the thicker the boundary layer, the more energy is transferred between the rotating spaced apart members and the fluid.

Figure 4A:
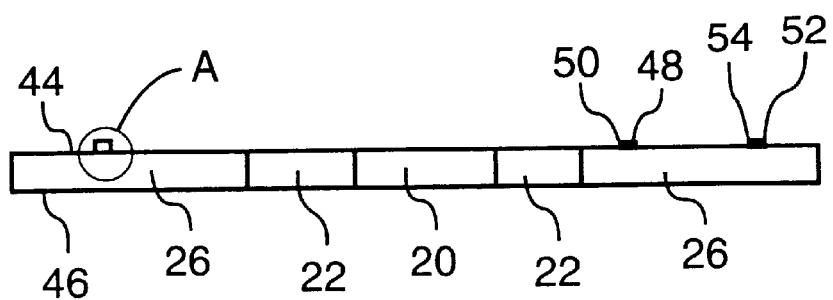
FIG. 4a is an side elevational view of the disc of FIG. 3.
Figure 4B:
Figure 4C:
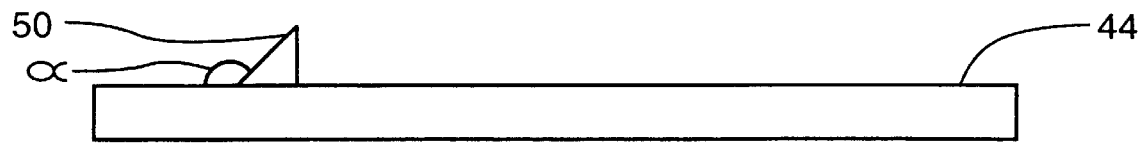
Figure 4D:
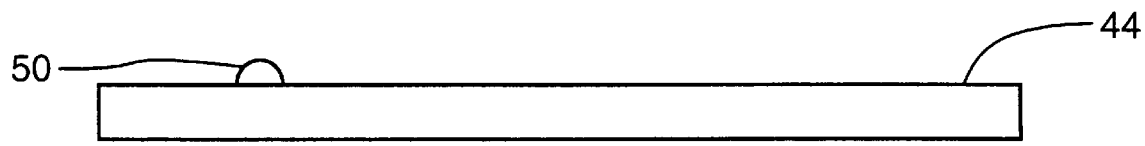

Side 50 of raised portion 48 may extend generally perpendicular to surface 44, 46 (eg. raised portion 48 may be a generally square or rectangular protuberance as shown in FIG. 4b) at an obtuse angle alpha (eg. 102–122° ) to surface 44, 46 (eg. raised portion 48 may be a generally triangular protuberance as shown in FIG. 4c), or a rounded member on surface 44, 46 (eg. raised portion 48 may be a generally hemispherical protuberance as shown in FIG. 4c). Raised portion 48 may be constructed as a point member so as to be positioned at a discrete location on surface 44, 46. Alternately, it may extend for an indefinite length as shown in FIG. 3.

Side 50 is preferably positioned such that the direction of travel of the fluid as it encounters side 50 is normal to side 50. As the travels outwardly over surface 44, 46, it will be subjected to both tangential and radial acceleration as shown by arrows T and R in FIG. 3. Generally, these forces will cause the fluid to travel outwardly at an angle of about 40° to the radial as shown in FIG. 3. By positioning side 50 at such an angle (eg. 30° to 50°), the direction of travel of the fluid as it encounters side 50 will be about 90°.

Raised portion 48 may have a vertical height from surface 44, 46 varying from about 0.5 to about 25, preferably from about 0.5 to about 10 and more preferably 0.5 to about 2 of the thickness of the boundary layer immediately upstream of raised portion 48.

The boundary layer may be delaminated from a particular opposed surface 44, 46 of a particular spaced apart member 12, or the delamination of the boundary layer from a particular opposed surface 44, 46 of a particular spaced apart member 12, may be assisted by providing an area on that spaced apart member 12 having an increased width (i.e. in the longitudinal direction) at at least one discrete location of the particular opposed surface 44, 46. Preferably, a plurality of such areas of increased width are provided on each opposed surface 44, 46 of a particular spaced apart member 12. Further, preferably such areas of increased width are provided on at least some, preferably a majority and most preferably all of spaced apart members of turbine 10.

Referring to FIGS. 3 and 4a–4d, such discrete areas of increased width may be provided by having raised portions 52 which are positioned on surface 44, 46. As shown in FIG. 3, these may be positioned on the outer portion of spaced apart member 12 such as adjacent outer edge 42 or spaced some distance inwardly from outer edge 42.

As the fluid travels over opposed surface 44, 46, it encounters raised portion 52. This results in, or assists in, the delamination of the boundary layer from opposed surface 44, 46. If the fluid has not delaminated from opposed surface 44, 46 when it reaches outer edge 42 then the delamination process will absorb energy from the prandtl layer turbine thereby reducing the overall efficiency of the prandtl layer turbine.

Raised portions 52 may be positioned adjacent outer edge 42 or at an intermediate position inwardly thereof as shown in FIG. 3. Further, as with raised portion 48, raised portion 52 preferably has an upstream side 54 which is a marked discontinuity to opposed surface 44, 46. As shown in FIG. 4a, side 54 extends longitudinally outwardly from surface 44, 46. However, raised portions 52 may have the same shape as raised portions 48.

As fluid travels radially outwardly between inner edge 40 and outer edge 42, a boundary layer is produced (with or without raised portions 48) which thickens as the boundary layer moves radially outwardly from shaft 20. Preferably, at least one raised portion 54 is positioned radially outwardly on opposed surface 44, 46. Preferably, raised portion 52 may be positioned at any point on surface 44, 46 where it is desired to commence the delamination process. Typically, the fluid will commence to delaminate at a position where the fluid has a velocity of about 103 to about 105 mach. Accordingly, raised portion 52 is positioned adjacent such a position and preferably just upstream of where the fluid reaches about 103 mach. This velocity corresponds to the region where the boundary layer achieves fluid flow characteristics which but for raised portion 52 would cause the fluid to delaminate.

Raised portion 52 may have a vertical height from surface 44, 46 varying from about 1 to about 100, preferably from about 1 to about 25 and more preferably 1 to about 5 of the thickness of the boundary layer immediately upstream of raised portion 52.

In another embodiment, any of the spaced apart members 12 may include both one or more raised areas 48 to assist in thickening the boundary layer and one or more raised areas 52 to assist in the delamination of the boundary layer.

In the specification, the word "fluid" is used to refer to both liquids and gases. In addition, due to the formation of a boundary layer adjacent opposed surfaces 44, 46, the fluid may include solid material since the formation of the boundary layer results in a reduction of, or the prevention of, damage to the surface of spaced apart members 12 by abrasion or other mechanical action of the solid material. For this reason, spaced apart members 12 may be made from any materials known in the art including plastic, metal, such as stainless steel, composite material such as Kevlar™ and reinforced composite materials such as carbon fibre or metal mesh reinforced Kevlar™.

Figure 5:
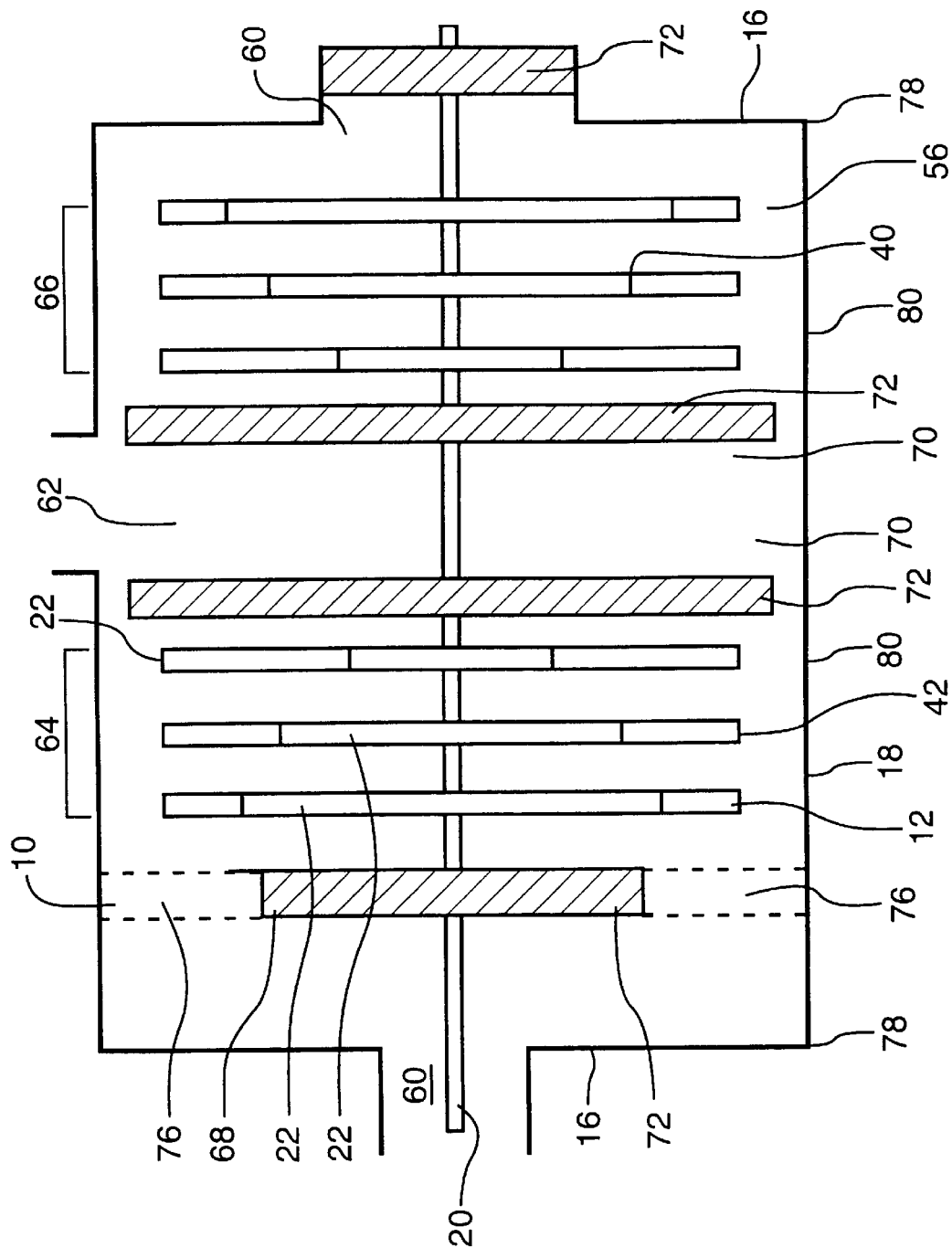
FIG. 5 is a longitudinal cross section of a prandtl layer turbine according to a second preferred embodiment of the instant invention.
Figure 10:
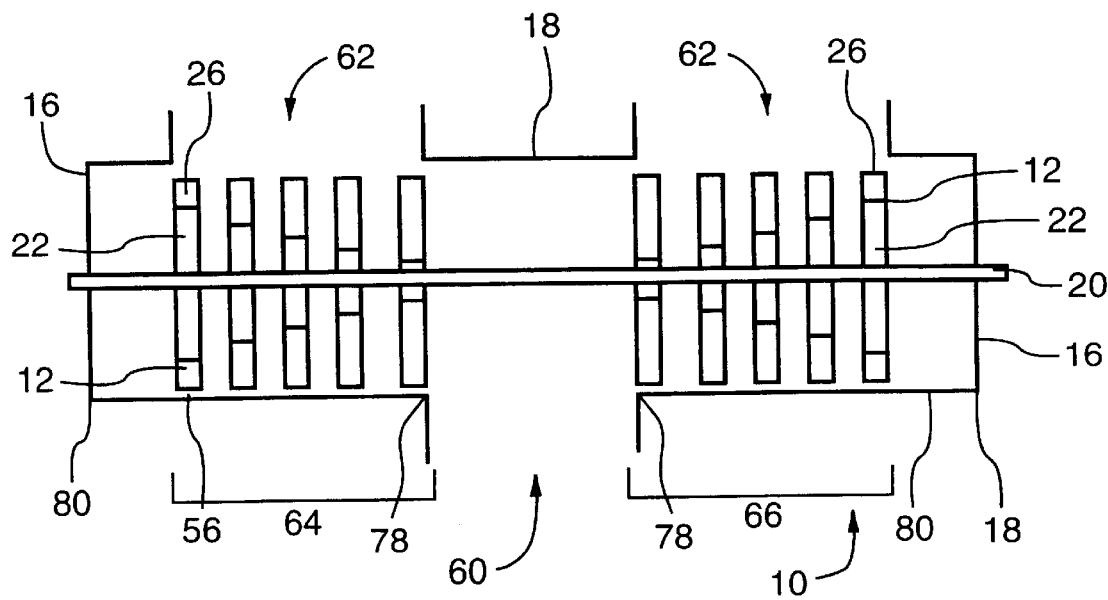
FIG. 10 is a longitudinal cross section of a prandtl layer turbine according to a fifth preferred embodiment of the instant invention.
Figure 11:
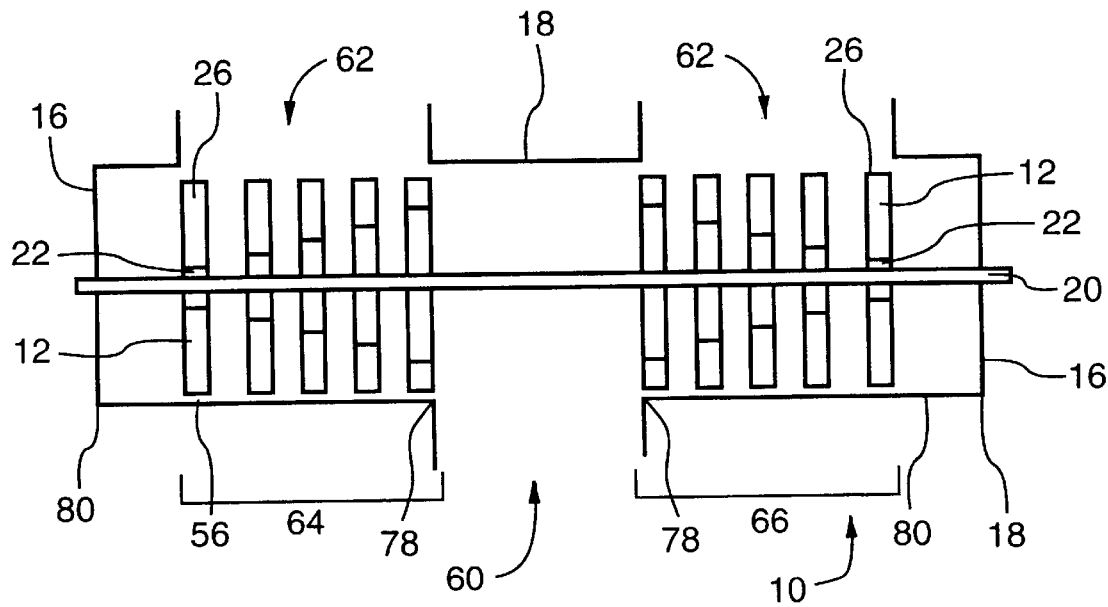
FIG. 11 is a longitudinal cross section of a prandtl layer turbine according to a sixth preferred embodiment of the instant invention.

In a further preferred embodiment of the instant invention, one or more fan members 68, 70 may be provided to assist in the movement of air through the prandtl layer turbines (see for example FIG. 5). This figure also shows a further alternate embodiment in which two prandtl layer turbines units 64, 66, each of which comprises a plurality of discs 12, are provided in a single housing 14. Each prandtl layer turbine unit 64, 66 is provided with an inlet 60 having a single outlet 62. Discs 12 of each prandtl layer turbine 64, 66 are mounted on a common shaft 20. This particular embodiment may advantageously be used to reduce the pressure drop through the prandtl layer turbine. For example, instead of directing all of the fluid at a set number of spaced apart members 12, half of the fluid may be directed to one half of the spaced apart members (prandtl layer turbine unit 64) and the other half may be directed at another set of spaced apart members (prandtl layer turbine unit 66). Thus the mean path through the prandtl layer turbine is reduced by half resulting in a decrease in the pressure loss as the fluid passes through prandtl layer turbine 10. In the embodiment of FIG. 5, the fluid feed is split in two upstream of housing 14 (not shown). Alternately, as shown in FIGS. 10 and 11, all of the fluid may be fed to a single inlet 60 which is positioned between prandtl layer turbine units 64, 66. While in these embodiments a like number of similar spaced apart members 12 have been included in each prandtl layer turbine unit 64, 66, each turbine unit 64, 66 may incorporate differing number of spaced apart members 12 and/or differently configured spaced apart members 12.

It will be appreciated that discs 12 of prandtl layer turbine unit 64 may be mounted on a first shaft 20 and discs 12 of the second prandtl layer turbine unit 66 may be mounted on a separate shaft 20 (not shown). This alternate embodiment may be used if the two shaft are to be rotated at different speeds. This can be advantageous if the prandtl layer turbine is to be used to as a separator as discussed below. If spaced apart members 12 are of the same design, then the different rotational speed of spaced apart members 12 will impart different flow characteristics to the fluid and this may beneficially be used to separate the fluid (or particles entrained into the fluid) into different fluid streams, each of which has a different composition.

Fan member 68 may be of any particular construction that will transport, or will assist in transporting, fluid to opening 22 of spaced apart member 12. Similarly, fan member 70 may be of any particular construction that will assist in the movement of fluid through unit 64, 66 and transport it, or assist in transporting it, to an outlet 62. Fan member 68 acts to pressurize the fluid and to push it downstream to one or more of spaced apart members 12. Conversely, fan member 70 acts to create a low pressure area to pull the fluid downstream, either through downstream spaced apart members 12 or through outlet 62. Fan member 70 may optionally be positioned outside of the interior of ring 18 so as to draw the fluid from housing 14. Such a fan member may be of any particular construction.

As shown by FIG. 5, a fan member 68 may be positioned immediately upstream of the first spaced apart member 12 of prandtl layer turbine unit 64. It will also be appreciated as also shown in FIG. 5 that fan member 68 may be positioned upstream from upstream end 78 of prandtl layer combining at 66. Fan member 68 has a plurality of blades 72 which are configured to direct fluid towards central opening 22 of the first spaced apart member 12. Blades may be mounted on a hub so as to rotate around shaft 20. Alternately, for example, fan 70 may be a squirrel cage fan or the like. As shown in FIG. 5, blades 72 are angled such that when fan member 68 rotates, fluid is directed under pressure at central opening 22.

Fan member 68 may be non-rotationally mounted on shaft 20 so as to rotate with spaced apart members 12. Alternately, fan member 68 may be mounted for rotation independent of the rotation of shaft 20, such as by bearings 76 which engage ring 18 (as shown in dotted outline in FIG. 5) or fan member 68 may be driven by a motor if it is mounted on a different shaft (not shown). If the prandtl layer turbine is functioning as a pump, then if fan member 68 is non-rotationally mounted on shaft 20, the rotation of shaft 20 will cause blades 72 to pressurize the fluid as it is introduced into the rotating spaced apart members. Alternately, if the prandtl layer turbine unit is to function as a motor, the movement of the fluid through housing 14 may be used to cause spaced apart members 12 to rotate and, accordingly, fan member 68 to rotate (if fan member 68 is freely rotatably mounted in housing 14). By pressurizing the fluid as it enters the spaced apart members with no other changes to spaced apart members 12, the pressure at outlet 62 is increased. As the downstream pressure may be increased, then there is additional draw on the fluid which allows additional spaced apart members 12 to be added to the prandtl layer turbine unit 64, 66.

Outlet fan members 70 may be mounted in the same manner as fan member 68. For example, outlet fan 70 may be non-rotatably mounted on shaft 20, or rotatably mounted in housing 14 independent of spaced apart member 12 such as by a bearing 76 (not shown). Blade 72 may be configured so as to direct fluid out of housing 14 through outlet 62. If fan member 70 is outside housing 14, then fan member is constructed so as to draw fluid from outlet 62 (not shown).

By providing a source of decreased pressure at or adjacent outlet 62, additional spaced apart members may be provided in a single prandtl layer turbine unit 64, 66. Further, an increased amount of the fluid may travel towards downstream end 80 such that the amount of fluid which passes over each spaced apart member 12 will be more evenly distributed.

In another preferred embodiment of the instant invention, the surface area of motive force transfer region 26 of opposed surfaces 44, 46 varies between at least two immediately adjacent spaced apart members 12. This may be achieved by varying one or both of the inner diameter and the outer diameter of spaced apart members 12.

Preferably, for at least a portion of the spaced apart members 12 of a prandtl layer turbine unit 64, 66, the distance between inner edge 40 and outer edge 42 of a spaced apart member 12 varies to that of a neighbouring spaced apart member 12. More preferably, the distance between inner edge 40 and outer edge 42 of a spaced apart member 12 varies to that of a neighbouring spaced apart member 12 for all spaced apart members in a prandtl layer turbine unit 64, 66. The distance between inner edge 40 and outer edge of 42 of spaced apart members 12 may increase in the downstream direction and preferably increases from upstream end 78 towards downstream end 80. Alternately, the distance between inner edge 40 and outer edge of 42 of spaced apart members 12 may decrease in the downstream direction and preferably decreases from upstream end 78 towards downstream end 80.

Figure 6:
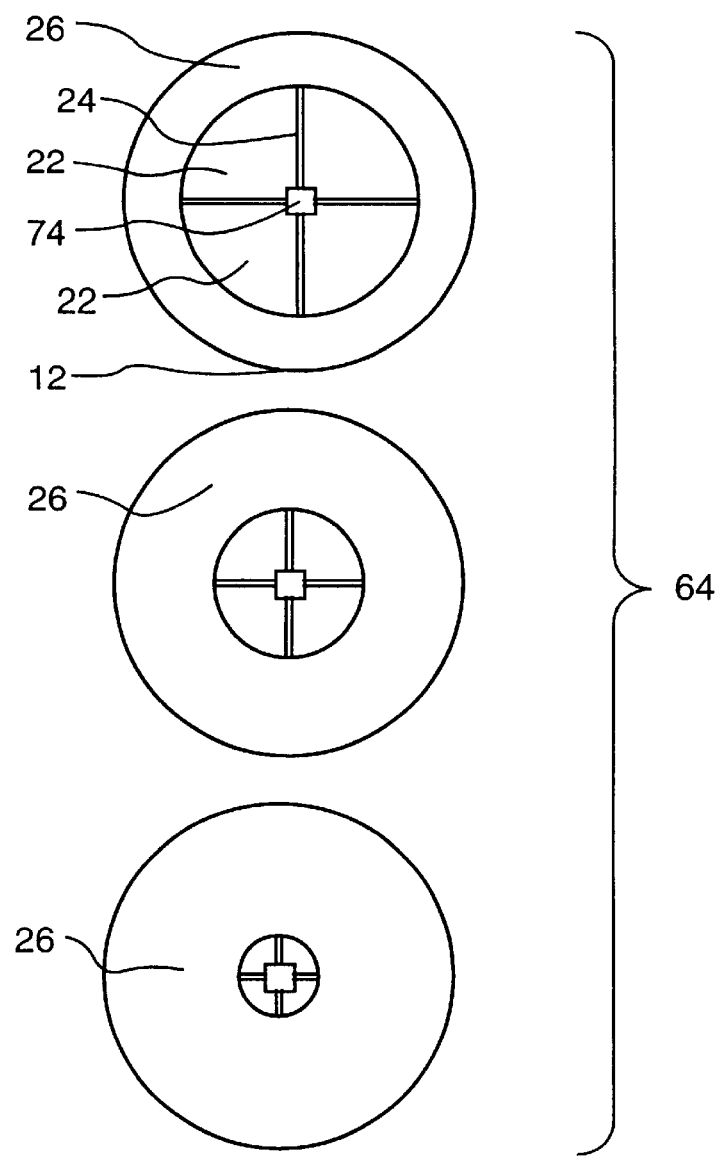
FIG. 6 is a schematic drawing of the spaced apart members of one of the prandtl layer turbine unit of FIG. 5.

As shown in FIGS. 5 and 6, the size of central opening 22 of at least one of the discs of prandtl air turbine unit 64, 66 varies from the size of the central opening of the remaining spaced apart members 12 of that prandtl air turbine unit.

FIG. 6 is a schematic diagram, in flow order, of the top plan views of spaced apart members 12 of prandtl layer turbine unit 64. As shown in this drawing, each spaced apart member has a centrally positioned shaft opening 74 for non-rotatably receiving shaft 20 (if shaft 20 has a square cross-section similar in size to that of shaft opening 74). It will be appreciated that spaced apart members 12 may be fixedly mounted to shaft 20 by any means known in the art.

Figure 8:
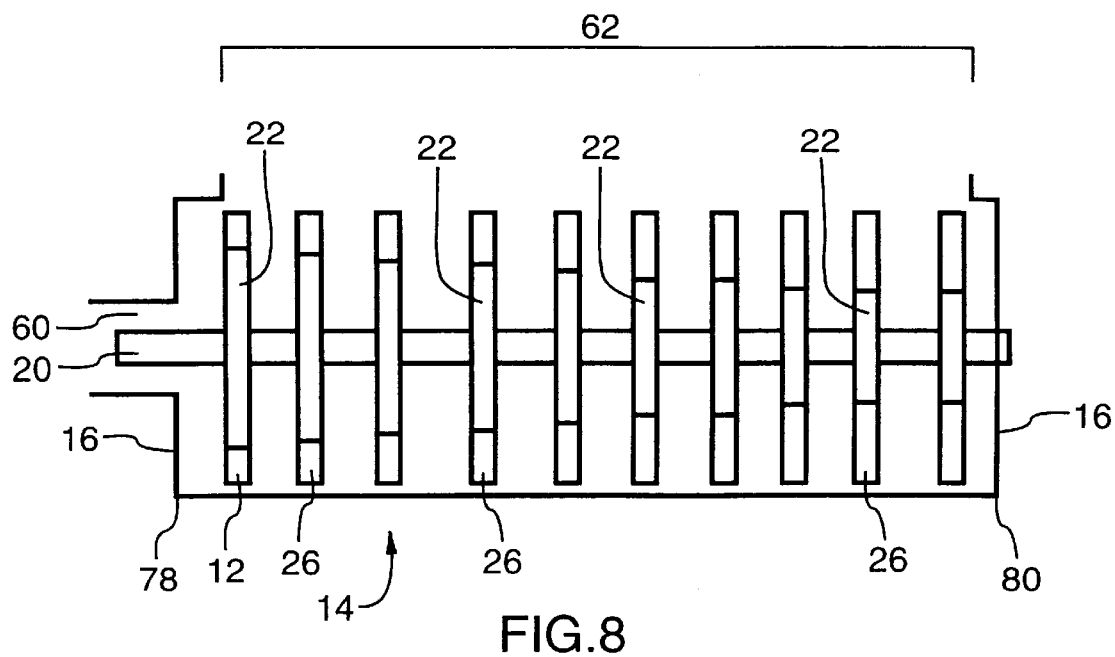
FIG. 8 is a longitudinal cross section of a prandtl layer turbine according to a third preferred embodiment of the instant invention.
Figure 9:
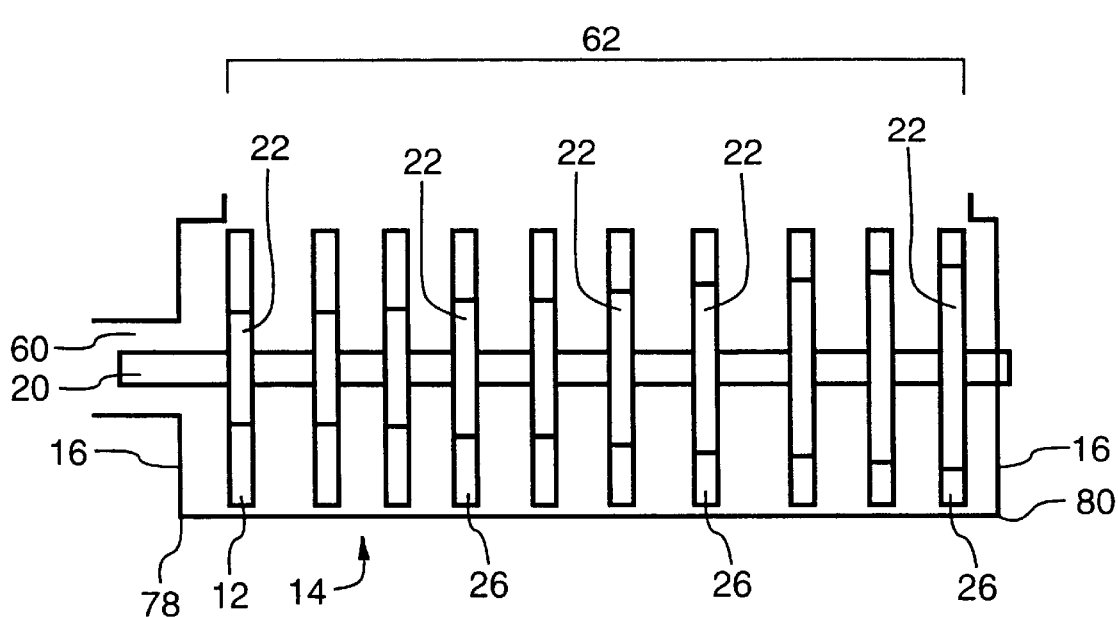
FIG. 9 is a longitudinal cross section of a prandtl layer turbine according to a fourth preferred embodiment of the instant invention.

In a more preferred embodiment, a major proportion of the spaced apart members have central openings 22 which are of varying sizes and, in a particularly preferred embodiment, the size of cental opening 22 varies amongst all of the spaced apart members of a prandtl layer turbine unit 64, 66. An example of this construction is also shown in FIGS. 8 and 9.

As the size of central opening 22 increases, then the amount of fluid which may pass downstream through the cental opening 22 of a spaced apart member 12 increases. Accordingly, more fluid may be passed downstream to other spaced apart members where the fluid may be accelerated. The size of central opening 22 may decrease in size for at least a portion of the spaced apart members 12 between upstream end 78 and downstream end 80. As shown in the embodiment of FIG. 8, the size of central opening 22 may continually decrease in size from upstream end 78 to downstream end 80.

Figure 7:
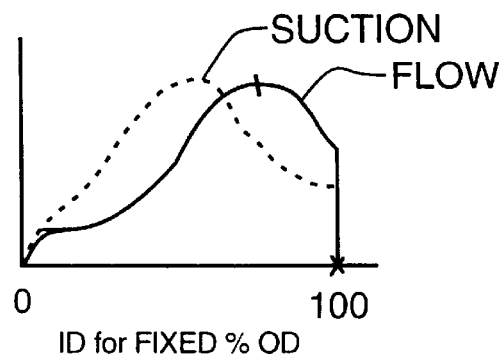
FIG. 7 is a graph of suction and flow versus the ratio of the inner diameter of a spaced apart member to the outer diameter of the same spaced apart member.

An advantage of this embodiment is that the amount of fluid which may pass through housing 14 per unit of time is increased. This is graphically represented in FIG. 7 wherein the relative amount of fluid which may flow per unit time through a prandtl layer turbine may be maximized by adjusting the ratio of the inner diameter of a spaced apart member 12 to its outer diameter. This ratio will vary from one prandtl layer turbine to another depending upon, inter alia, the speed of rotation of spaced apart members 12 when the turbine is in use, the spacing between adjacent spaced apart members. However, as the size of cental opening 22 increases, then, for a given size of a spaced apart member 12, the surface area of motive force transfer region 26 of spaced apart member 12 is decreased. Accordingly, this limits the velocity which the fluid may achieve as it travels between inner edge 40 and outer edge 42 of a spaced apart member 12 on its way to outlet 62. Thus, by increasing the amount of fluid which may flow through the prandtl layer turbine 10, the amount of suction which may be exerted on the fluid at inlet 60 is decreased as is also shown in FIG. 7.

The size of central opening 22 may increase in size for at least a portion of the spaced apart members 12 between upstream end 78 and downstream end 80. As shown in FIG. 9, the size of cental opening 22 may continuously increase from upstream end 78 to downstream end 80. Less fluid passes through each central opening 22 to the next spaced apart member 12 in the downstream direction. Accordingly, less fluid will be available to be accelerated by each successive spaced apart member 12 and accordingly each successive spaced apart member 12 may have a smaller motive force transfer area 26 to achieve the same acceleration of the fluid adjacent the opposed surface 44, 46 of the respective spaced apart member 12.

In the embodiments of FIGS. 8 and 9, the size of openings 22 varies from one spaced apart member to the next so as to form, in total, a generally trumpet shaped path (either decreasing from upstream end 78 to downstream end 80 (FIG. 8) or increasing from upstream end 78 to downstream end 80 (FIG. 9). It will be appreciated that the amount of difference between the size of central openings 22 of any to adjacent spaced apart members 12 may vary by any desired amount. Further, the size of the openings may alternately increase and decrease from one end 78, 80 to the other end 78, 80.

As shown in FIG. 5, more than one prandtl layer turbine unit 64, 66 may be provided in a housing 14. Further, the size of central opening 22 of the spaced apart members 12 of any particular prandtl layer turbine unit 64, 66 may vary independent of the change of size of central openings 22 of the spaced apart members 12 of a different prandtl layer turbine 64, 66 in the same housing 14 (not shown). As shown in FIG. 5, the size of central opening 22 decreases from each upstream end 78 to each downstream end 80. However, it will be appreciated that, if desired, for example, the size of central openings 22 may decrease in size from upstream end 78 to downstream end 80 of prandtl air turbine unit 64 while the size of central openings 22 may increase in size from upstream end 78 to downstream end 80 of prandtl layer turbine unit 66.

FIGS. 10 and 11 show a further alternate embodiment wherein the size of cental openings 22 varies from end 78, 80 to the other end 78,80. In this particular design, the fluid inlet is positioned centrally between two prandtl layer turbine units 64, 66. In the embodiment of FIG. 10, the size of cental opening 22 increases from upstream end 78 to downstream end 80 thus producing a prandtl layer turbine 10 which has improved suction. This is particularly useful if the prandtl layer turbine is to be used as a pump or fan to move a fluid.

In the embodiment of FIG. 11, the size of central opening 22 decreases from upstream end 78 to downstream end 80 thus producing a prandtl layer turbine 10 that has improved fluid flow. This particular embodiment would be advantageous if the prandtl layer turbine end were used as a compressor or pump.

Figure 12A:
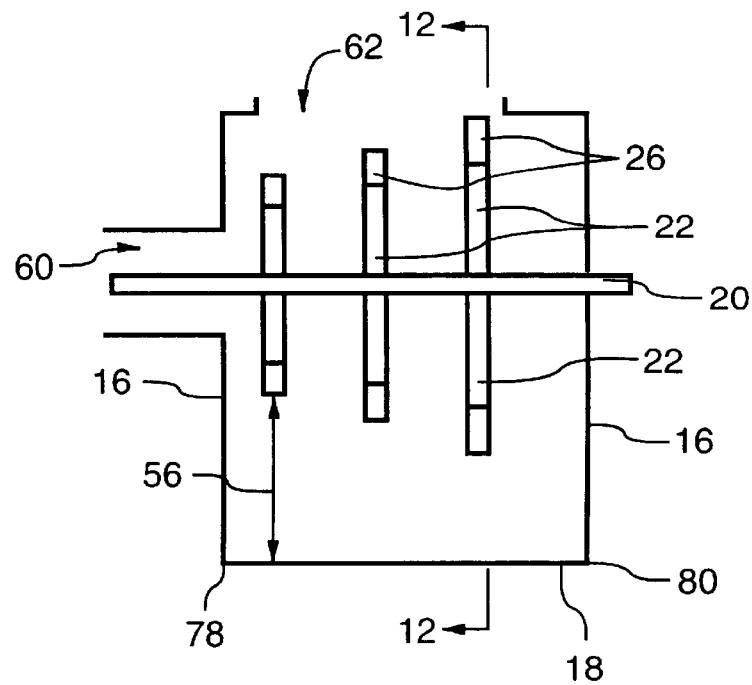
FIG. 12a is a longitudinal cross section of a prandtl layer turbine according to a seventh preferred embodiment of the instant invention.
Figure 12B:
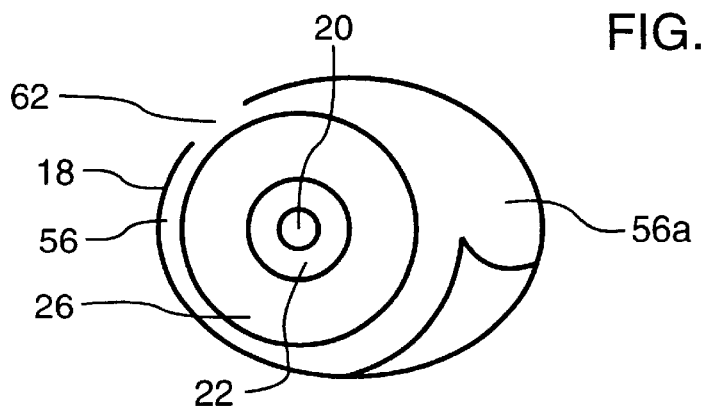

In the embodiments of FIGS. 5–9, each spaced apart member 12 is in the shape of a disc which has the same outer diameter. Further, the housing has a uniform diameter. Accordingly, for each spaced apart member 12, space 56 (which extends from outer edge 42 of each spaced apart member 12 to the inner surface of longitudinally extending 18) has the same radial length. In a further alternate embodiment of this invention, the outer diameter of each spaced apart member 12 may vary from one end 78, 80 to the other end 78, 80 (see FIGS. 12 and 13). In such an embodiment, space 56 may have a differing radial length (see FIG. 12) or it may have the same radial length (see FIG. 13). If prandtl layer turbine 10 is to be used as a separator, the then space 56 preferably includes a portion 56a which is an area of reduced velocity fluid (eg. a dead air space) in which the separated material may settle out without being re-entrained in the fluid. For example, as shown in FIG. 12b, ring 18 has an elliptical portion so as to provide portion 56a.

Figure 13:
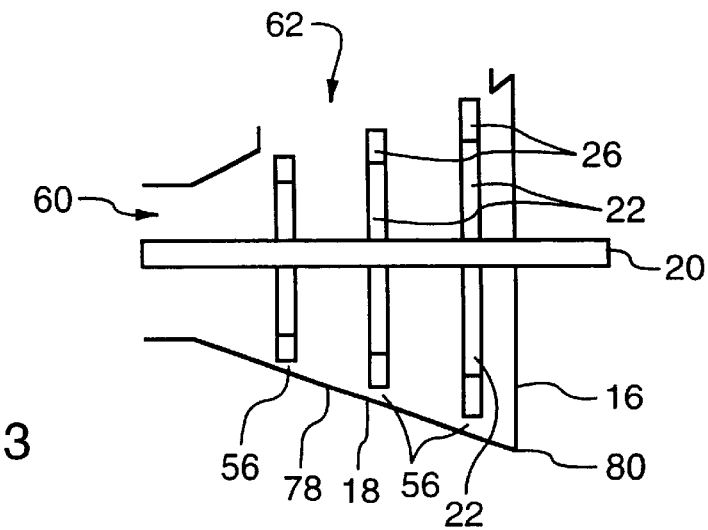
FIG. 13 is a longitudinal cross section of a prandtl layer turbine according to an eighth preferred embodiment of the instant invention.

It will be appreciated that in either of these embodiments, the size of cental opening 22 may remain the same (as is shown in FIG. 13) or, alternately, cental opening 22 may vary in size. For example, as shown in FIG. 12, cental opening may increase in size from upstream end 78 to downstream end 80. This particular embodiment is advantageous as it increases the negative pressure in housing 14 at downstream end 80, and increases the fluid flow through prandtl layer turbine 10. Alternately, the size of cental opening 22 may vary in any other manner, such as by decreasing in size from upstream end 78 to downstream end 80 (not shown).

In a further preferred embodiment of the instant invention, a plurality of prandtl layer turbine units 64, 66 may be provided wherein the surface area of the motive force transfer region 26 of the spaced apart members 12 of one prandtl layer turbine unit 64, 66 have is different to that of the spaced apart members 12 of another prandtl layer turbine unit 64, 66. This may be achieved by the outer diameter of at least some of the spaced apart members 12 of a first prandtl layer turbine unit 64 having an outer diameter which is smaller than the outer diameter of at least some of the spaced apart members 12 of a second prandtl layer turbine unit 66. In a preferred embodiment, all of the spaced apart members 12 of prandtl layer turbine unit 64 have an outer diameter which is smaller than the outer diameter of each of the spaced apart members 12 of prandtl layer turbine unit 66. Examples of these embodiments are shown in FIGS. 14–17. It will be appreciated that more than two prandtl layer turbine units 64, 66 may be provided in any particular prandtl layer turbine 10. Two have been shown in FIGS. 14–17 for simplicity of the drawings.

Figure 14:
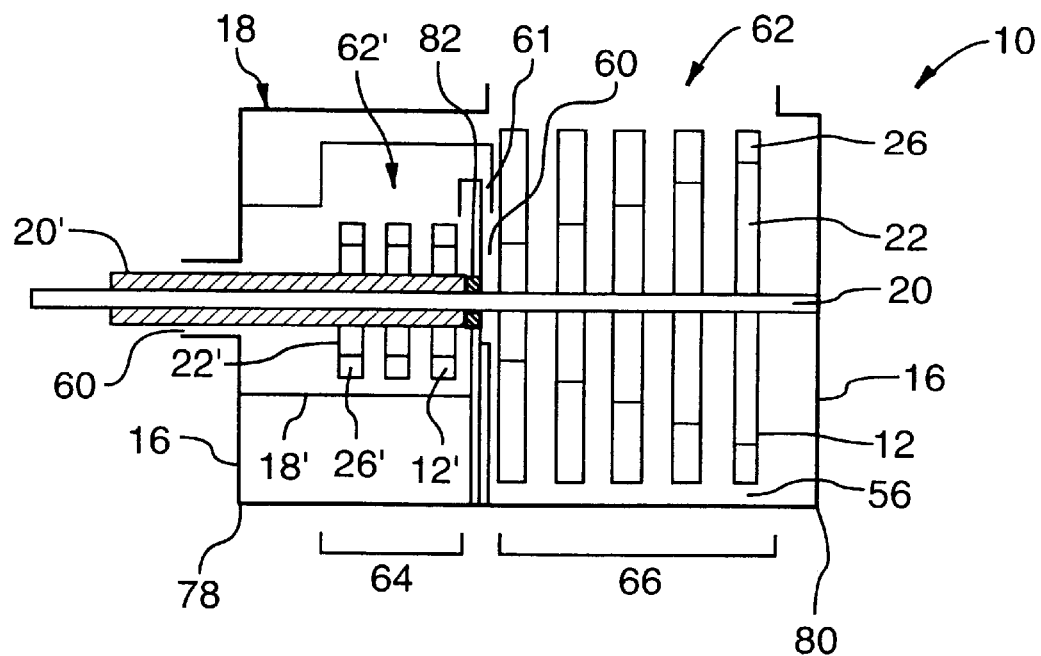
FIG. 14 is a longitudinal cross section of a prandtl layer turbine according to a ninth preferred embodiment of the instant invention.
Figure 15:
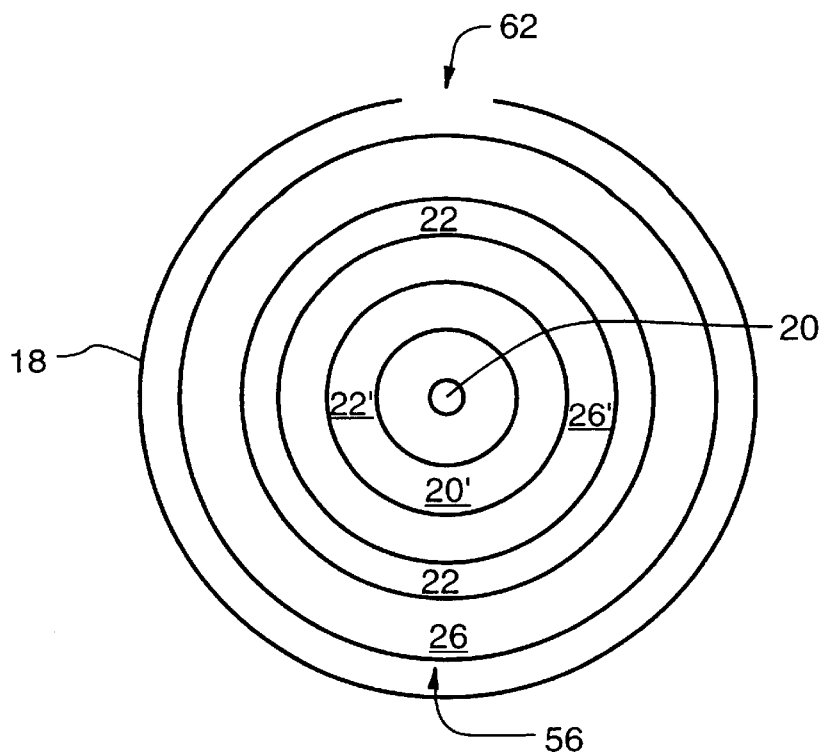
FIG. 15 is an end view from upstream end 78 of the prandtl layer turbine of FIG. 14.

Referring to FIGS. 14 and 15, the spaced apart members 12 of prandtl layer turbine unit 64 have the same outer diameter and the spaced apart members 12 of prandtl layer turbine unit 66 have the same outer diameter. The outer diameter of the spaced apart members 12 of prandtl layer turbine unit 64 is smaller than the outer diameter of the spaced apart members 12 of prandtl layer turbine unit 66. As discussed above with respect to FIGS. 5–13, the outer diameter and/or the inner diameter of the spaced apart members of one or both of prandtl layer turbine units 64, 66 may vary so that the surface area of motive force transfer area 26 may vary from one spaced apart member 12 to another spaced apart member 12 in one or both of prandtl layer turbine units 64, 66.

As shown in FIG. 14, prandtl layer turbine unit 64 is provided in series with prandtl layer turbine unit 66. Further, the spaced apart members 12 of prandtl layer turbine unit 64 are non-rotatably mounted on shaft 20' and the spaced apart members 12 of prandtl layer turbine unit 66 are non-rotatably mounted on shaft 20. It will be appreciated that prandtl layer turbine unit 64 may be provided in the same housing 14 as prandtl layer turbine unit 66 or, alternately, it may be provided in a separate housing which is an airflow communication with the housing of prandtl layer turbine unit 66. Preferably, in such an embodiment, each prandtl layer turbine unit 64, 66 is mounted co-axially. Optionally, the spaced apart members of prandtl layer turbine units 64 and 66 may be non rotationally mounted on the same shaft 20 (see for example FIGS. 16 and 17).

Prandtl layer turbine unit 64 has inlet 60' and is rotationally mounted on shaft 20' whereas prandtl layer turbine unit 66 as an inlet 60 and is mounted for rotation on shaft 20. Fluid passes through spaced apart members 12' to outlet 62' from where it is fed to inlet 60 such as via passage 61. Thus the fluid introduced into prandtl layer turbine unit 66 may have an increased pressure. Passage 61 may extend in a spiral to introduce fluid tangentially to prandtl layer turbine units 66. Thus the fluid introduced into prandtl layer turbine unit 66 may already have rotational momentum in the direction of rotation of spaced apart members 12.

Figure 16:
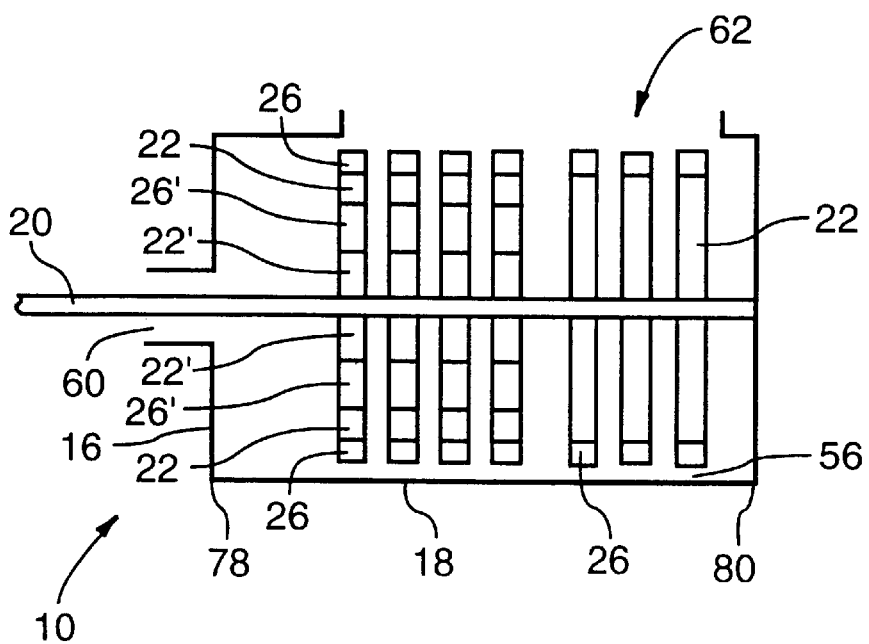
FIG. 16 is a longitudinal cross section of a prandtl layer turbine according to a tenth preferred embodiment of the instant invention.
Figure 17:
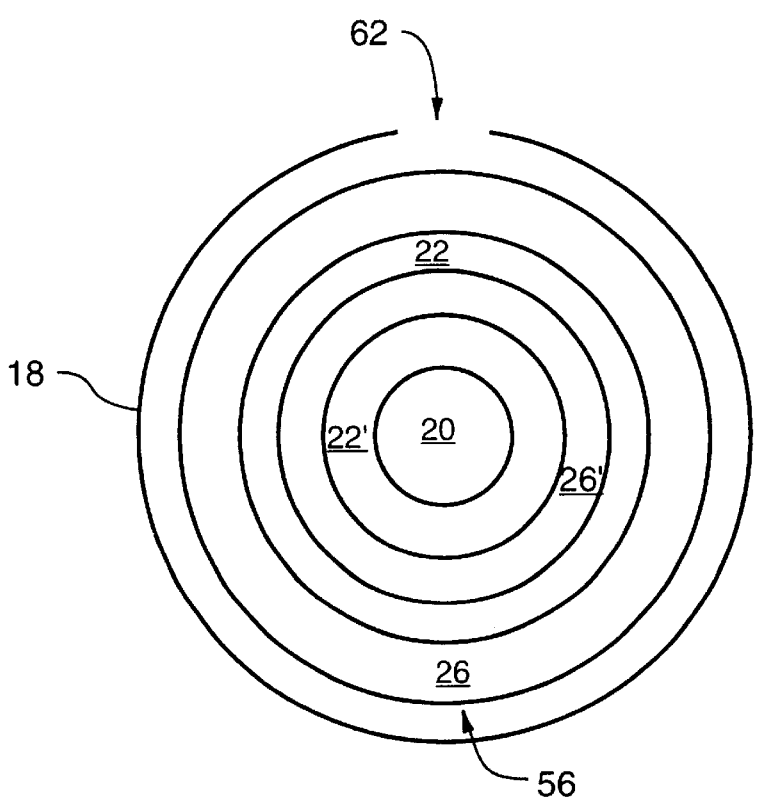
FIG. 17 is an end view from upstream end 78 of the prandtl layer turbine of FIG. 16.

In a further preferred embodiment as shown in FIGS. 16 and 17, prandtl layer turbine unit 64 may be nested within prandtl layer turbine unit 66. For ease of reference, in FIG. 16, the cental openings and motive force transfer regions of prandtl layer turbine unit 64 are denoted by reference numerals 22' and 26'. The central opening and motive force transfer regions of the spaced apart members of prandtl layer turbine unit 66 are denoted by reference numerals 22 and 26. The spaced apart members of prandtl layer turbine units 64 and 66 may be mounted on the same shaft 20 or the spaced apart members of each prandtl layer turbine unit 64, 66 may be mounted on its own shaft 20 (as shown in FIG. 14).

It will be appreciated that prandtl layer turbine unit 64 may be only partially nested within prandtl layer turbine 66. For example, the upstream spaced apart members 12 of prandtl layer turbine unit 64 may be positioned upstream from the first spaced apart member 12 of prandtl layer turbine unit 66 (not shown). Further, prandtl layer turbine units 64, 66 need not have the same length. For example, as shown in FIG. 16, prandtl layer turbine unit 64 comprises four discs whereas prandtl layer turbine unit 66 comprises seven discs. In this embodiment, the prandtl layer turbine unit 64 commences at the same upstream position as prandtl layer turbine unit 66 but terminates at a position intermediate of prandtl layer turbine unit 66. It will be appreciated that prandtl layer turbine unit 64 may extend conterminously for the same length as prandtl layer turbine unit 66. Further, it may commence at a position downstream of the upstream end of prandtl layer turbine unit 66 and continue to an intermediate position of prandtl layer turbine unit 66 or it may terminate to or past the downstream end of prandtl layer turbine unit 66.

In a further alternate preferred embodiment, as shown in FIG. 14, prandtl layer turbine unit 64 is rotationally mounted on shaft 20' whereas prandtl layer turbine unit 66 is mounted for rotation on shaft 20. For example, shaft 20' may be rotationally mounted around shaft 20 by means of bearings 82 or other means known in the art. In this manner, spaced apart members 12 of prandtl layer turbine unit 64 may rotate at a different speed to spaced apart members 12 of prandtl layer turbine unit 66. Preferably, prandtl layer turbine unit 64 (which has spaced apart members 12 having a smaller outer diameter) rotates at a faster speed than prandtl layer turbine unit 66. For example, if a first prandtl layer turbine unit had discs having a two inch outer diameter, the prandtl layer turbine unit could rotate at speeds up to, eg., about 100,000 rpm. A second prandtl layer turbine unit having larger sized discs (eg. discs having an outer diameter from about 3 to 6 inches) could rotate at a slower speed (eg. about 35,000 rpm). Similarly, a third prandtl layer turbine unit which had discs having an even larger outer diameter (eg. from about 8 to about 12 inches) could rotate at an even slower speed (eg. about 20,000 rpm). In this way, the smaller discs could be used to pressurize the fluid which is subsequently introduced into a prandtl layer turbine unit having larger discs. By boosting the pressure of the fluid as it is introduced to the larger, slower rotating discs, the overall efficiency of the prandtl layer turbine 10 may be substantially increased. In particular, each stage may be designed to operate at its optimal flow or pressure range. Further, if the fluid is compressible. For example, the increase in the inlet pressure will increase the outlet pressure, and therefore the pressure throughout housing 14. This increase in pressure, if sufficient, will compress the fluid (eg. a gas or a compressible fluid) in housing 14. This increases the density of the fluid and the efficiency of the transfer of motive force between the fluid and the spaced apart members.

Figure 18:
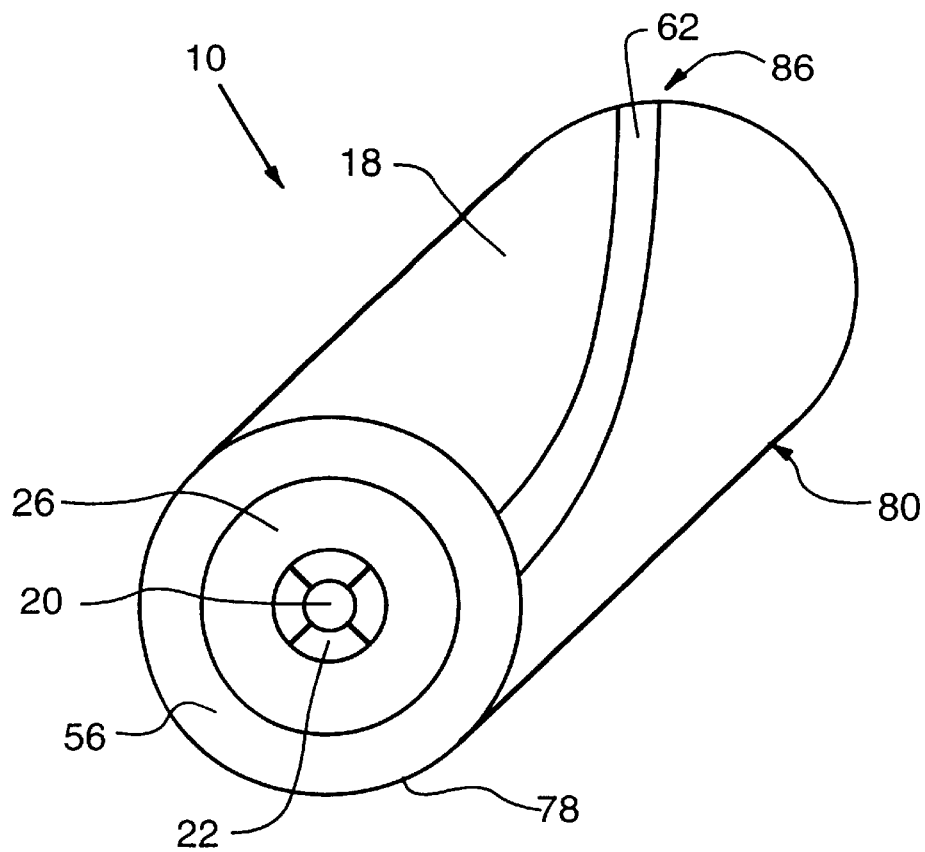
FIG. 18 is a perspective view of a prandtl layer turbine according to an eleventh preferred embodiment of the instant invention.
Figure 19:
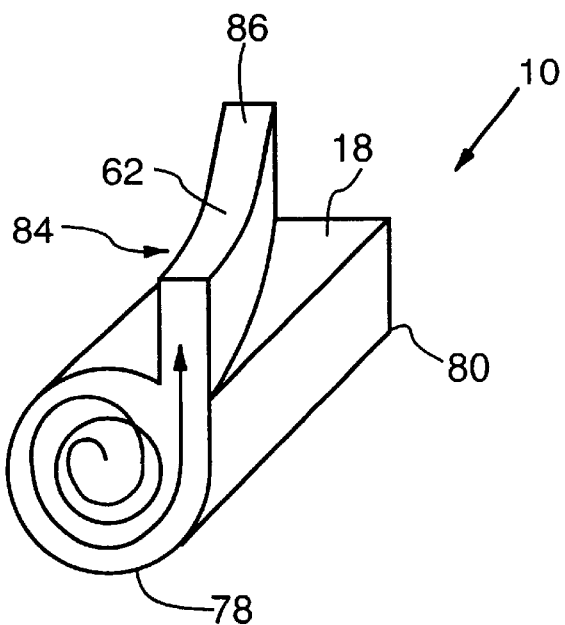
FIG. 19 is a further perspective view of the prandtl layer turbine of FIG. 18 wherein additional housing of the outlet is shown.

Referring to FIGS. 18 and 19, a further preferred embodiment of the instant invention is shown. Fluid outlet port 62 extends between a first end 84 and a second end 86. Traditionally, in prandtl layer turbine units, outlet port 62 has extended along a straight line between first and second ends 84 and 86. According to the preferred embodiment shown in FIGS. 18 and 19, second and 86 of fluid outlet port 62 is radially displaced around housing 14 from first end 84. The portion of the fluid that passes downstream through opening 22 of a spaced apart member 12 will have some rotational momentum imparted to in even though it does not pass outwardly at that location adjacent that spaced apart member. Therefore, assuming that all spaced apart members are similar, the portion of the fluid which passes outwardly along the next spaced apart member will delaminate at a different position due to the rotational momentum imparted by its passage through opening 22 in the immediate upstream spaced apart member. Outlet 62 is preferably configure to have an opening in line with the direction of travel of the fluid as it delaminates and travels to ring 18. Thus downstream portions of outlet 62 are preferably radially displaced along ring 18 in the direction of rotation of spaced apart members 12.

Preferably, fluid outlet port 62 is curved and it may extend as a spiral along ring 18. Preferably, the curvature or spiral extends in the same direction as the rotation of the spaced apart members 12. The fluid flow in prandtl layer turbine 10 is generally represented by the arrow shown in FIG. 19. As represented by this arrow, the fluid will travel in a spiral path outwardly across an opposed surface 44, 46 and then radially outwardly through fluid outlet port 62. Fluid outlet port 62 preferably curves in the same direction as the direction of the rotation of the spaced apart members.

It will be appreciated that all of fluid outlet port 62 need not be curved as shown in FIGS. 18 and 19. For example, a portion of fluid outlet port 62 may be curved and the remainder may extend in a straight line as is known in the prior art. It will further be appreciated that while fluid outlet port 62 in FIG. 18 extends conterminously with spaced apart members 12, first and second ends 84 and 86 need not coincide with the upstream and downstream ends of the spaced apart members 12. In particular, fluid outlet port 62 may have any longitudinal length as is known in the art.

Figure 20:
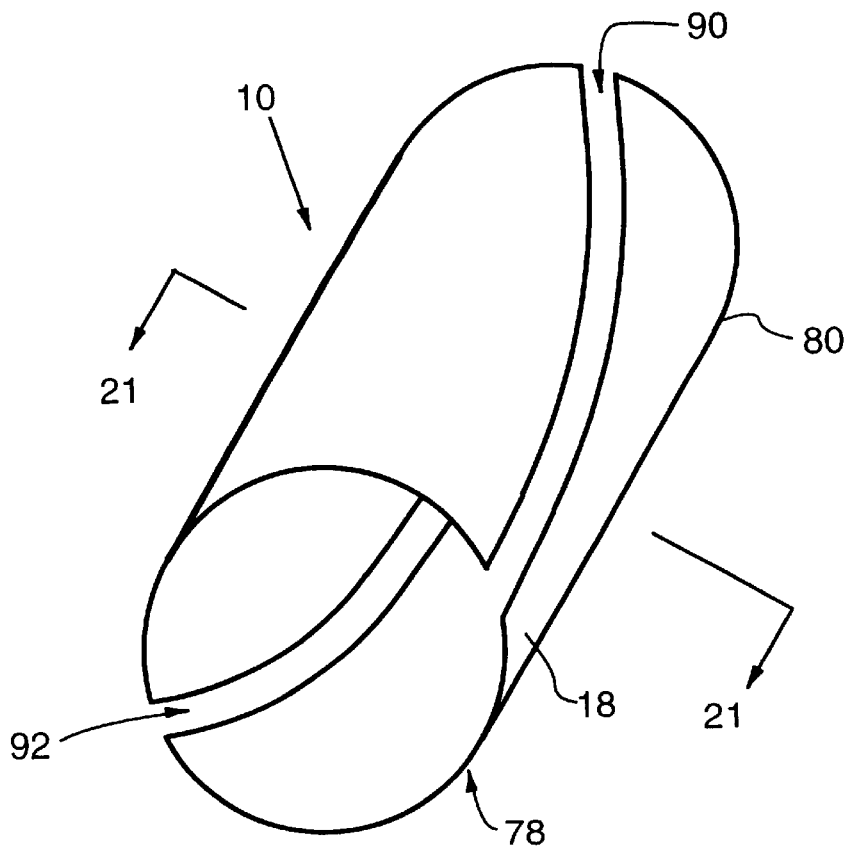
FIG. 20 is a perspective view of the longitudinally extending ring of a prandtl layer turbine according to an twelfth preferred embodiment of the instant invention.

According to further preferred embodiment of the instant invention, a single prandtl layer turbine unit 64, 66 may have a plurality of outlets 62. Each outlet 62 may be constructed in any manner known in the art or, alternately they may be constructed as disclosed herein. For example, they may extend in a spiral or curved fashion around ring 18 in the direction of rotation of spaced apart members 12 of a prandtl layer turbine unit 64, 66. Referring to FIG. 20, the ring of a prandtl layer turbine 10 having a single prandtl layer turbine unit 64, 66 is shown. In this embodiment, two outlets, 90 and 92 are provided. Each outlet extends longitudinally along ring 18 from upstream end 78 of spaced apart members 12 to downstream end 80 of spaced apart members 12. For ease of reference, spaced apart members 12 have not been shown in FIG. 20.

Each outlet 90, 92 may be of any particular construction known in the art or taught herein. For example, each outlet 90, 92 may extend in a curve or spiral around ring 18. Outlets 90, 92 may have the same degree of curvature or, alternately, the degree of curvature may vary to allow separation of a specific density and mass of particulate matter. For example, if prandtl layer turbine 10 is used for particle separation, particles having a different shape and/or mass will travel outwardly at different positions. The outlets are preferably positioned to receive such streams and thus their actual configuration will vary depending upon the particle separation characteristics of the turbine.

Each outlet 90, 92 may curve in the same direction (eg. the direction of rotation of spaced apart members 12). Alternately, they may curve in opposite directions or one or both may extend in a straight line as is known in the prior art. Further, a plurality of such outlets 90 may be provided.

It will be appreciated that in an alternate embodiment, each outlet 90, 92 may be a portion 56a wherein the separated particulate matter may settle out and be removed from housing 14 and an outlet 62 may be provided to receive the fluid from which the particulate material has been removed.

Assuming that the portion of a fluid which is introduced through a central opening 22 to a position adjacent an opposed surface 44, 46 has approximately the same momentum, and assuming that the fluid has portions of differing density, then the rotation of spaced apart member 12 will cause the portions of the fluid having differing densities to commence rotating around shaft 20 at differing rates. As the fluid travels outwardly between inner edge 40 and outer edge 42 during its travel around shaft 20, the portions of the fluid having differing densities will tend to delaminate and travel outwardly towards ring 18 at different locations around ring 18. Accordingly, in a preferred embodiment of this invention, a fluid outlet port is positioned to receive each portion of the fluid as it delaminates from the opposed surface. Accordingly, in the embodiment shown in FIG. 20, it is assumed that the fluid would contain two distinctive portions (eg. two elements having differing densities). Fluid outlet ports 90 and 92 are angularly displaced around ring 18 so as to each receive one of these portions.

If the fluid also contains a solid, then, due to aerodynamic effects, particles having the same density but differing sizes will tend to separate due to the centrifugal forces exerted upon the particles as they travel in the fluid from inner edge 40 to outer edge 42. Accordingly, a prandtl layer turbine may also be utilized as a particle separator. For example, in the embodiment of FIG. 20, if the particles have the same density, then first outlet 90 may be positioned to receive particles having a first particle sized distribution and fluid outlet port 92 may be positioned to receive particles having a smaller particle size distribution.

The positioning of fluid outlet ports 90, 92 may be selected based upon several factors including the total mass and density of the fluid and/or particles to be separated, the amount of centrifugal force which is imparted to the fluid and any entrained particles by spaced apart members 12 (eg. the inner diameter of spaced apart members 12, the outer diameter spaced apart members 12, the longitudinal spacing between adjacent spaced apart members 12, the disc thickness and the speed of rotation of spaced apart members 12).

In the embodiment of FIG. 20, outlets 90 and 92 may be in flow communication with any downstream apparatus which may be desired. Accordingly, each portion of the fluid may be passed downstream for different processing steps.

Figure 21:
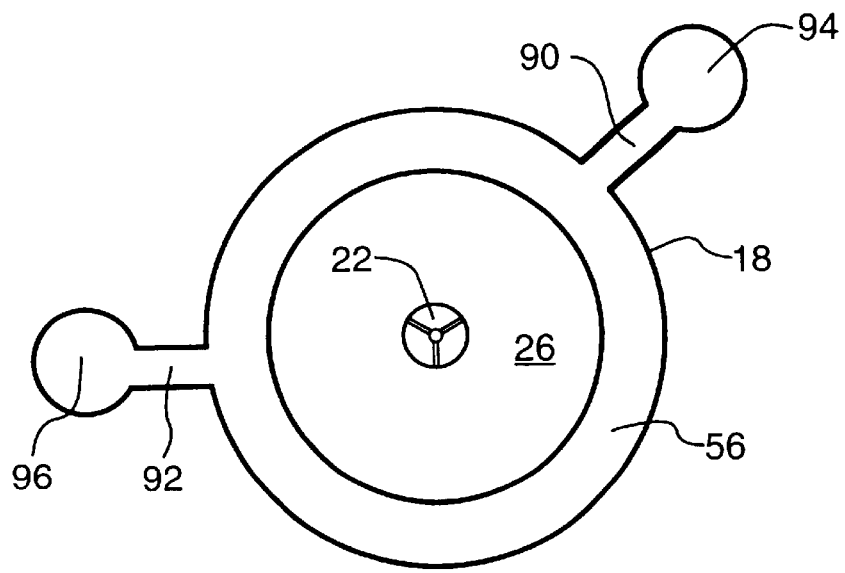
FIG. 21 is a transverse cross section along the line 21—21 of a prandtl layer turbine having the longitudinally extending ring of FIG. 20 wherein the turbine has secondary cyclones in flow communication with the turbine outlets.

Referring to FIG. 21, two cyclones 94, 96 may be provided in flow communication with fluid outlet ports 90, 92. For example, if the fluid includes particulate matter, fluid outlet port 90 may be positioned to receive particles having a first particle sized distribution. First cyclone 94 may be provided in fluid flow communication with first outlet port 90 for separating some or all of the particles from the fluid. Similarly, fluid outlet port 92 may be positioned to receive a portion of the fluid containing particles having a different particle sized distribution and second cyclone 96 may be provided to remove some or all of these particles from the fluid.

Generally, cyclones are effective to efficiently remove particles over a limited particle size distribution. By utilizing a prandtl layer turbine to provide streams having different particle size distributions, each of cyclones 94, 96 may be configured to efficiently separate the particles which will be received therein from the fluid. It will be appreciated that a plurality of such cyclones 94, 96 may be provided. Each cyclone 94, 96 may be of any particular design known in the art. Further, they may be the same or different.

It will be appreciated that while several improvements in prandtl layer turbines have been exemplified separately or together herein, that they may be used separately or combined in any permutation or combination. Accordingly, for example, the turbines, whether nested or in series, may have varying inner and/or outer diameters. Further, any of the prandtl layer turbines disclosed herein may have a curved or spiral outlet 62. Further, if a central air inlet 60 is utilized as disclosed in FIGS. 10 and 11, two fluid outlet ports having the same or differing curvature may be employed or, alternately, all or a portion of each of the outlets 62 may extend in a straight line. It will further be appreciated that even if a series of nested turbines are utilized to pressurize the fluid, that an inlet fan member 68 may also be incorporated into the design. Further, any of the prandtl layer turbines disclosed herein may have an outlet fan member 70. These and other combinations of the embodiments disclosed herein are all within the scope of this invention.

Prandtl layer turbines may be used in any application wherein a fluid must be moved. Further, a prandtl layer turbine may be used to convert pressure in a fluid to power available through the rotational movement of a shaft.

In one particular application, a prandtl layer turbine may accordingly be used to assist in separating two or more fluids from a fluid stream or in separating particulate matter from a fluid stream or to separate particulate matter carried in a fluid stream into fluid streams having different particle sized distributions or a combination thereof (FIGS. 20 and 21).

A further particular use of such a prandtl layer turbine may be as the sole particle separation device of a vacuum cleaner or, alternately, it may be used with other filtration mechanisms (eg. filters, filter bags, electrostatic precipitators and/or cyclones) which may be used in the vacuum cleaner art.

Figure 22:
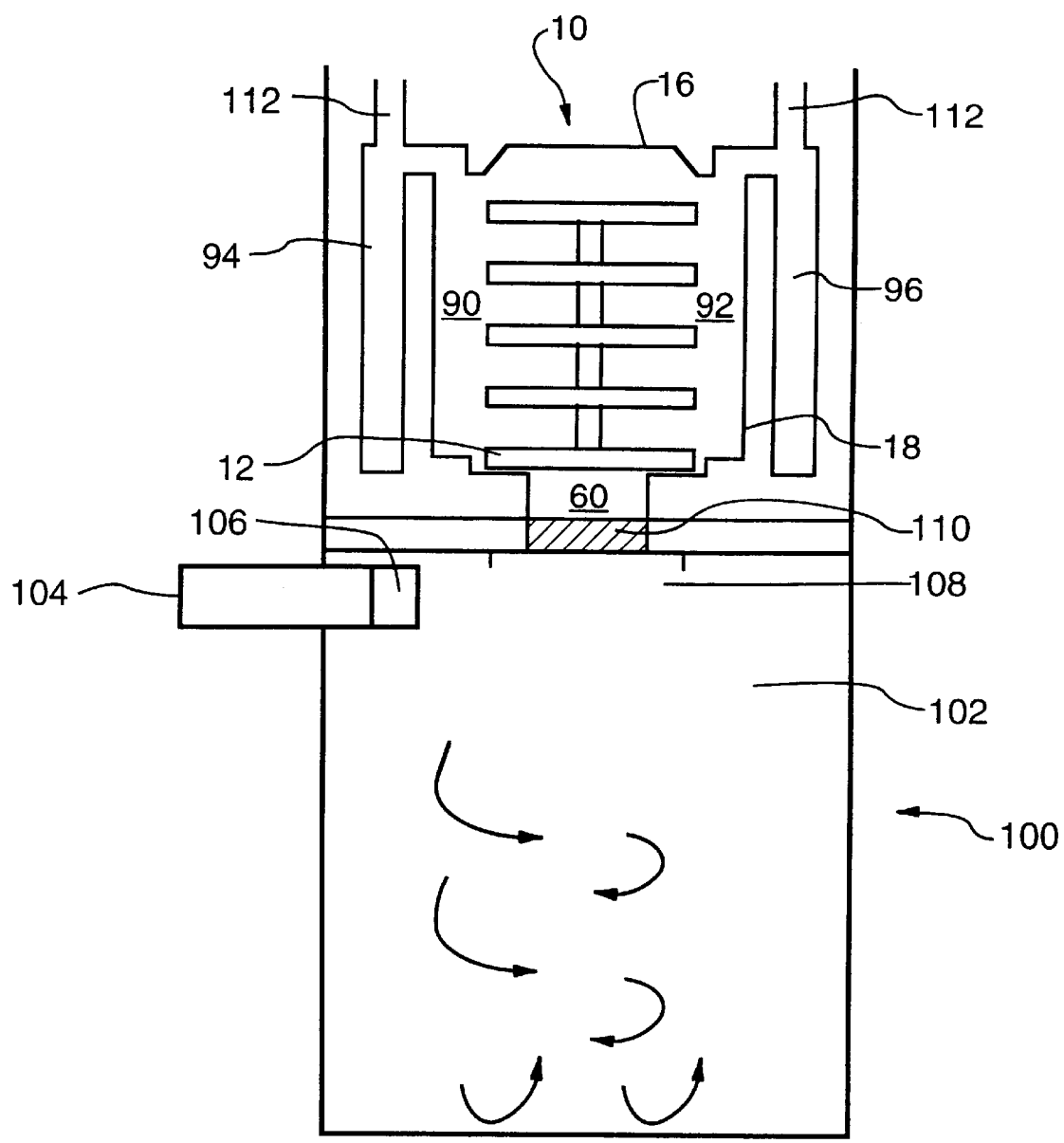
FIG. 22 is longitudinal section of a vacuum cleaner incorporating a prandtl layer turbine.

Referring to FIG. 22, a vacuum cleaner including a prandtl layer turbine is shown. In this embodiment, vacuum cleaner 100 includes a first stage cyclone 102 having an air feed passage 104 for conveying dirt laden air to tangential inlet 106. First stage cyclone 102 may be of any particular design known in the industry. The air travels cyclonically downwardly through first stage cyclone 102 and then upwardly to annular space 108 where it exits first stage cyclone 102. It will be appreciated by those skilled in the art that cyclone 102 may be of any particular orientation. Generally, a first stage cyclone may remove approximately 90% of the particulate matter in the entrained air.

The partially cleaned air exiting first stage cyclone 102 via annular space 108 may next be passed through a filter 110. Filter 110 may be of any design known in the art. For example, it may comprise a mesh screen or other filter media known in the art. Alternately, or in addition, filter 110 may be an electrostatic filter (eg. an electrostatic precipitator). In such an embodiment, the electrostatic filter is preferably designed to remove the smallest particulate matter from the entrained air (eg. up to 30 microns). In another embodiment, the air may be passed instead to one or most second cyclones. In a further alternate embodiment, the air may be passed before or after the one or more second cyclones through filter 110.

The filtered air may then passes next into inlet 60 of prandtl layer turbine 10. Depending upon the efficiency of the cyclone and the filter (if any) and the desired level of dirt removal, the prandtl layer turbine may be used to provide motive force to move the dirty air through the vacuum cleaner but not to itself provide any dirt separation function. The prandtl layer turbine is preferably positioned in series with the cyclone such that the air exiting the cyclone may travel in a generally straight line from the cyclone to the prandtl layer turbine. If the vacuum cleaner is an upright vacuum cleaner, then the prandtl layer turbine is preferably vertically disposed above the air outlet from the cyclone. If the vacuum cleaner is a canister vacuum cleaner, then the prandtl layer turbine is preferably horizontally disposed upstream of the air outlet from the cyclone.

Subsequent to its passage trough the prandtl layer turbine, the air may be passed through filter 110 and/or one or more second cyclones in any particular orders. Further, in any embodiment, prior to exiting the vacuum cleaner, the air may be passed through a HEPA™ filter.

In an alternate embodiment, the prandtl layer turbine may also function as a particle separator. For example, in the embodiment of FIG. 22, the prandtl layer turbine of FIG. 21 has been incorporated. Prandtl layer turbine 10 separates the particulate matter into two streams having different particle size distributions. These streams separately exit prandtl layer turbine 10 via outlets 90, 92 and are fed tangentially into cyclones 94, 96. The cleaned air would then exits cyclones 94, 96 via clean air outlets 112. This air may be further filtered if desired, used to cool the motor of the vacuum cleaner or exhausted from the vacuum cleaner in any manner known in the art.

It will be appreciated that these embodiments may also be used to separate solid material from any combination of fluids (i.e. from a gas stream, from a liquid stream or from a combined liquid and gas stream). Further, these embodiments may also be used to separate one fluid from another (eg. a gas from a liquid or two liquids having differing densities).

Figure 23:
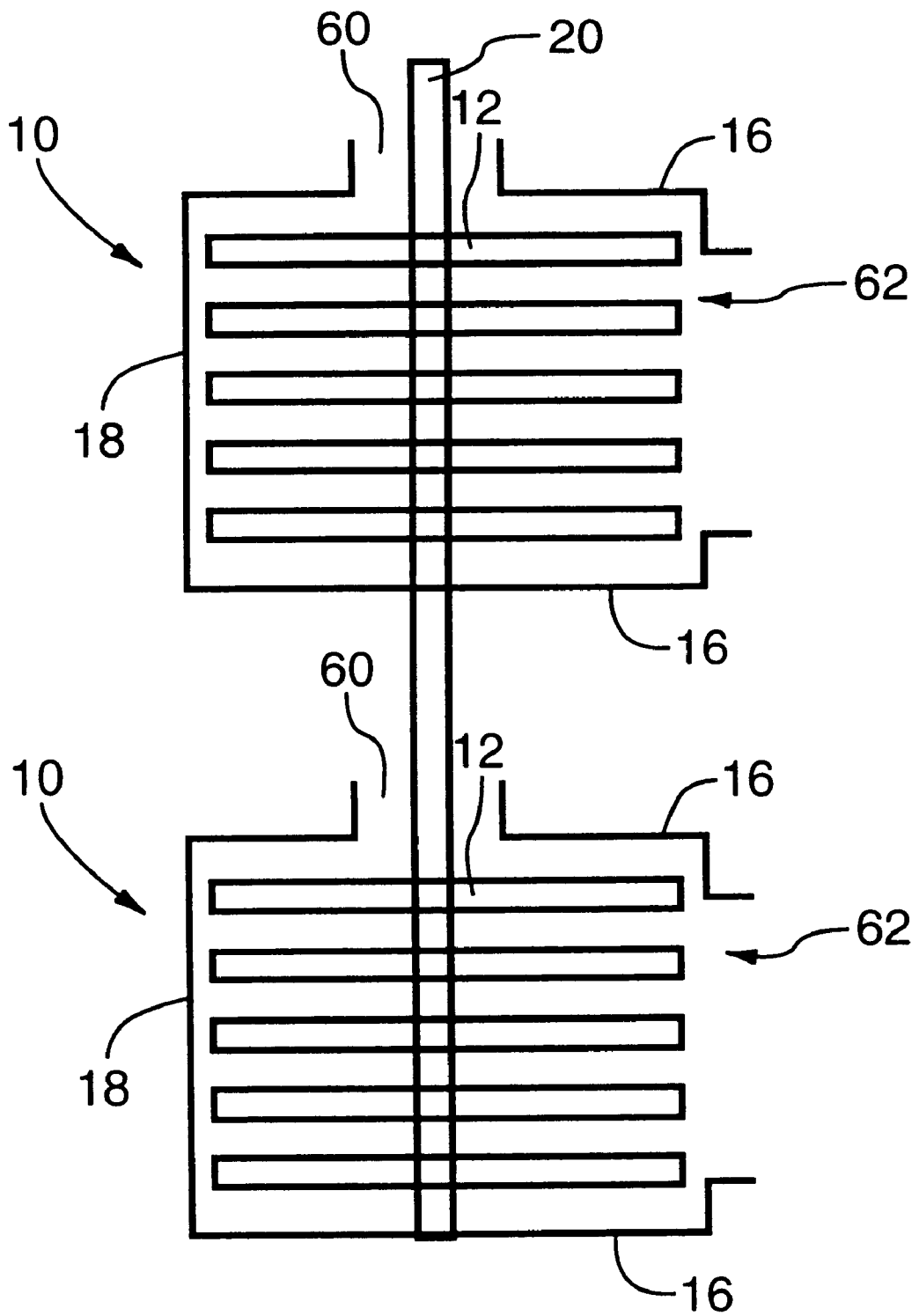
FIG. 23 is a longitudinal section of a mechanically coupled prandtl layer motor and a prandtl layer fan.

In a further particular application, two prandtl layer turbines may be used in conjunction whereby a first prandtl layer turbine is used as a motor and a second prandtl layer turbine is used as a fan/pump to move a fluid. The prandtl layer turbine which is used as a motor is drivingly connected to provide motive force to the second prandtl layer turbine. An example of such an embodiment is shown in FIG. 23. In FIG. 23, reference numeral 10' denotes the prandtl layer turbine which is used as a motor (the power producing prandtl layer turbine). Reference numeral 10 denotes the prandtl layer turbine which is used as a fan/pump (the fluid flow causing element).

Each prandtl layer turbine 10, 10' may be of any particular construction known in the art or described herein. Further, each prandtl layer turbine 10, 10' may be of the same construction (eg. number of discs, size of discs, shape of discs, spacing between discs, inner diameter of discs, outer diameter of discs and the like) or of different constructions. It will be appreciated that the configuration of each prandtl layer turbine 10, 10' may be optimized for the different purpose for which it is employed.

A first fluid is introduced through inlet port 60' into prandtl layer turbine 10'. The passage of fluid through prandtl layer turbine 10' causes spaced apart members 12' to rotate thus causing shaft 20 to rotate. The fluid exits prandtl layer turbine 10' through, for example, outlet 62' which may be of any particular construction known in the art or described herein.

The fluid introduced into prandtl layer turbine 10' may be a pressurized fluid which will impart motive force to spaced apart members 12'. Alternately, or in addition, fluid 10 may be produced by the fluid expanding as it passes through prandtl layer turbine 10'. For example, if prandtl layer turbine 10' has a substantial pressure drop, then another source of fluid for prandtl layer turbine 10' may be a pressurized liquid which expands to a gas as it travels through prandtl layer turbine 10' or a pressurized gas which expands as it travels through prandtl layer turbine 10. The fluid may also be the combustion product of a fuel. The fuel may be combusted upstream of prandtl layer turbine 10' or within prandtl layer turbine 10'. The combustion of the fluid will produce substantial quantities of gas which must travel through prandtl layer turbine 10' to exit via outlet 62'. Another source of fluid for prandtl layer turbine 10' may be harnessing natural fluid flows, such as ocean currents, ocean tides, the wind or the like.

As a result of the passage of a fluid through prandtl layer turbine 10', motive force is obtained which may then be transmitted to prandtl layer turbine 10. As shown in FIG. 23, spaced apart members 12 of prandtl layer turbine 10 are mounted on the same shaft 20 as spaced apart members 12' of prandtl layer turbine 10'. However, it will be appreciated that prandtl layer turbine 10', and 10 may be coupled together in any manner which would transmit the motive force produced in prandtl layer turbine 10' to the spaced apart members 12 of prandtl layer turbine 10. For example, each series of spaced apart members 12, 12' may be mounted on a separate shaft and the shafts may be coupled together by any mechanical means known in the art such that prandtl layer turbine 10' is drivingly connected to prandtl layer turbine 10.

Prandtl layer turbine 10 has an inlet 60 which is in fluid flow connection with a second fluid. The rotation of shaft 12 will cause spaced apart members 12 to rotate and to draw fluid through inlet 60 to outlet 62. Accordingly, prandtl layer turbine 10' may be used as a pump or a fan to cause a fluid to flow from inlet 60 to outlet 62. Depending upon the power input via shaft 20 to prandtl layer turbine 10, the fluid exiting prandtl layer turbine 10 via outlet 62 may be at a substantial elevated pressure.

Accordingly, prandtl layer turbine 10' functions as a motor and may be powered by various means such as the combustion of fuel. Accordingly, prandtl layer turbine 10' produces power which is harnessed and used in prandtl layer turbine 10 for various purposes.

Figure 24:
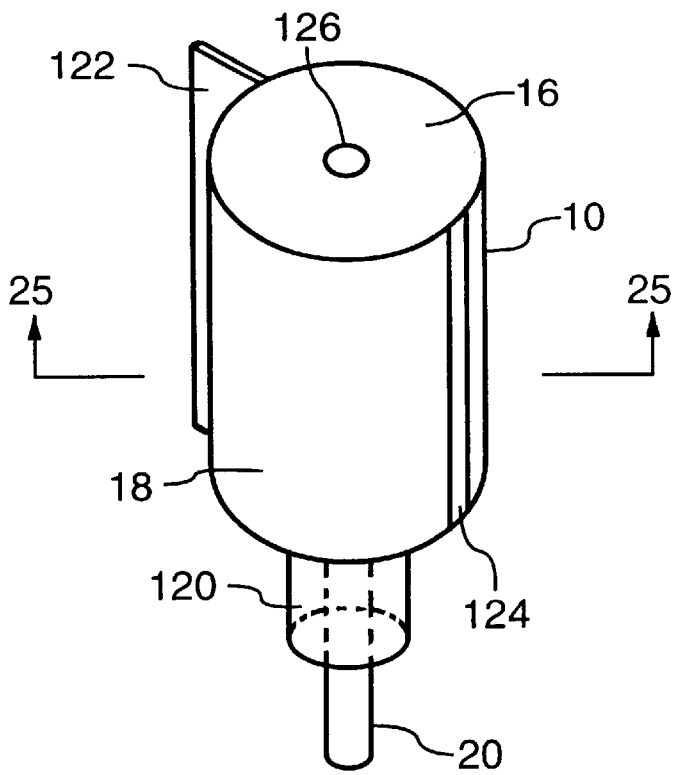
FIG. 24 is a perspective view of a windmill incorporating a prandtl layer turbine; and, FIG. 25 is a cross section along the line 25—25 of the windmill of FIG. 24.
Figure 25:
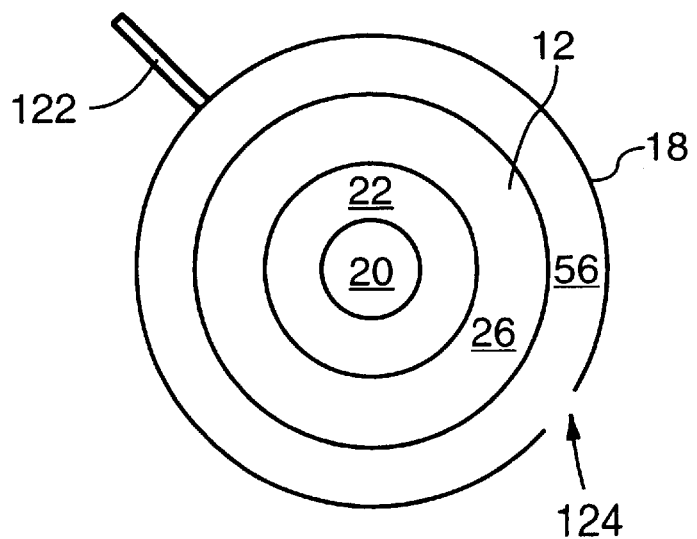

Referring to FIGS. 24 and 25, a prandtl layer turbine which may be used to produce motive force from a naturally moving fluid (such as wind or an ocean current or a tide) is shown. In this embodiment, prandtl layer turbine 10 (which may be of any particular construction) is provided with a fluid inlet 124 (for receiving wind or water). The entry of the fluid through inlet port 124 causes spaced apart members 12 to rotate. In this embodiment, the fluid would travel radially inwardly along spaced apart members 12 from the outer edge 42 to inner edge 40. The fluid would then travel downstream through central opening 22 to fluid outlet 126. The rotation of spaced apart members 12 by the fluid would cause shaft 20 to rotate. Shaft 20 exits from prandtl layer turbine 10 and provides a source of rotational motive force which may be used in any desired application (eg. electrical generation and pumping water).

Prandtl layer turbine is preferably rotatably mounted so as to align inlet 124 with the direction of fluid flow so that the fluid is directed into prandtl layer turbine 10. It will also be appreciated that inlet 124 may be configured (such as having a funnelled shape or the like) to capture fluid and direct it into spaced apart members 12. In FIG. 24, prandtl layer turbine 10 is positioned vertically on support member 120. It will be appreciated that prandtl layer 10 may also be horizontally mounted (or at any other desired angle).

Tail 122 may be provided on ring 18 and positioned so as to align inlet 124 with the fluid flow. Tail 122 may be constructed in any manner known in the art such that when the portion of the fluid which does not enter prandtl layer turbine 10 passes around ring 18, tail 122 causes opening 124 to align with the direction of the fluid flow thereby assisting in maintaining opening 124 aligned with the fluid flow as the direction of fluid flow changes.

We claim:

1. A Prandtl layer turbine comprising:
   (a) a longitudinally extending housing having a fluid inlet port and a fluid outlet port;
   (b) a plurality of spaced apart members, each spaced apart member having a surface for passage of fluid from an inner opening in the spaced apart member to an outer edge of the spaced apart member, the spaced apart members being rotatably mounted in the housing to transmit motive force between fluid introduced through the fluid inlet port and the spaced apart members due to a boundary layer which is formed adjacent the opposed surfaces of the spaced apart members as they rotate, the spaced apart members having an upstream end and a downstream end; and,
   (c) at least one fan member having at least one blade and positioned between two of the spaced apart members for directing fluid into the inner opening of the spaced apart members.

2. The Prandtl layer turbine as claimed in claim 1 wherein the at least one fan member is positioned adjacent the upstream end of the spaced apart members.

3. The Prandtl layer turbine as claimed in claim 2 wherein the at least one fan member rotates in a space and the diameter of the space is substantially the same as the diameter of the inner opening of the spaced apart member immediately downstream of the fan member.

4. The Prandtl layer turbine as claimed in claim 1 wherein at least one fan member is positioned between two of the spaced apart members.

5. The Prandtl layer turbine as claimed in claim 1 wherein the Prandtl layer turbine is configured to remove particulate matter entrained in the fluid and the Prandtl layer turbine is positioned upstream of a motor whereby the Prandtl layer turbine functions as a prefilter for the motor.

6. An apparatus comprising:
   (a) a longitudinally extending housing having a fluid inlet port and a fluid outlet port;
   (b) a plurality of spaced apart members rotatably mounted in the housing to transmit motive force between fluid introduced through the fluid inlet port and the spaced apart members, the spaced apart members having an upstream end and a downstream end; and,
   (c) at least one fan member having at least one blade is positioned adjacent the upstream end of the spaced apart members and at least one fan member is positioned adjacent the downstream end of the spaced apart members, at least one of the fan members is rotatably mounted with the spaced apart members.

7. The apparatus as claimed in claim 6 wherein the Prandtl layer turbine is configured to remove particulate matter entrained in the fluid and the Prandtl layer turbine is positioned upstream of a motor whereby the Prandtl layer turbine functions as a prefilter for the motor.

8. A Prandtl layer turbine comprising:
   (a) a housing having a fluid inlet port and a fluid outlet port;
   (b) a shaft rotatably mounted in the housing;
   (c) a plurality of spaced apart members mounted on the shaft and rotatable therewith, each spaced apart member having a radial inner end defining an inner opening, a radial outer end and a pair of opposed surfaces extending therebetween defining a continuous fluid flow passage between the inner opening and the radial outer end, each surface having a radial inner portion and a radial outer portion, the spaced apart members being rotatably mounted in the housing to transmit motive force between fluid introduced through the fluid inlet port and the spaced apart members due to a boundary layer which is formed adjacent the opposed surfaces of the spaced apart members as they rotate, the spaced apart members having an upstream end and a downstream end; and,
   (d) at least one fan member having at least one blade and positioned between two of the spaced apart members for assisting in withdrawing fluid from the Prandtl layer turbine.

9. The Prandtl layer turbine as claimed in claim 8 wherein at least one fan member is positioned adjacent the downstream end of the spaced apart members.

10. The Prandtl layer turbine as claimed in claim 9 wherein the fan member rotates in a space and the diameter of the space is substantially the same as the diameter of the outer end of the spaced apart member immediately upstream of the fan member.

11. The Prandtl layer turbine as claimed in claim 8 wherein the Prandtl layer turbine is configured to remove particulate matter entrained in the fluid and the Prandtl layer turbine is positioned upstream of a motor whereby the Prandtl layer turbine functions as a prefilter for the motor.

12. An apparatus comprising:
   (a) a first Prandtl layer turbine comprising a plurality of spaced apart member having a radial inner end defining an inner opening, a radial outer end, an outer diameter and a pair of opposed surfaces extending therebetween defining a continuous fluid flow passage between the inner opening and the radial outer end, each surface having a radial inner portion and a radial outer portion; and,
   (b) a second Prandtl layer turbine comprising a plurality of spaced apart member having a radial inner end defining an inner opening, a radial outer end, an outer diameter and a pair of opposed surfaces extending therebetween defining a continuous fluid flow passage between the inner opening and the radial outer end, each surface having a radial inner portion and a radial outer portion wherein at least some of the spaced apart members of the first Prandtl layer turbine have an outer diameter that is different than the outer diameter of at least some of the spaced apart members of the second Prandtl layer turbine.

13. The apparatus of claim 12 wherein the first Prandtl layer turbine is at least partially upstream from the second Prandtl turbine and at least some of the spaced apart members of the second Prandtl layer turbine have an outer diameter that is larger than the outer diameter of at least some of the spaced apart members of the first Prandtl layer turbine.

14. The apparatus of claim 12 wherein the first and second Prandtl layer turbines are mounted on a common shaft.

15. The apparatus of claim 12 wherein the first and second Prandtl layer turbines are mounted on different shafts.

16. A Prandtl layer turbine comprising:
   (a) a longitudinally extending housing having a fluid inlet port and a fluid outlet port;
   (b) a plurality of spaced apart members, each spaced apart member having a surface for passage of fluid from an inner opening in the spaced apart member to an outer edge of the spaced apart member, the spaced apart members being rotatably mounted in the housing to transmit motive force between fluid introduced through the fluid inlet port and the spaced apart members due to a boundary layer which is formed adjacent the opposed surfaces of the spaced apart members as they rotate, the spaced apart members having an upstream end and a downstream end; and,
   (c) at least one fan member having at least one blade, the at least one fan member is positioned adjacent the upstream end of the spaced apart members and rotates in a space wherein the diameter of the space is substantially the same as the diameter of the inner opening of a spaced apart member immediately adjacent to the fan member.

* * * * *